United States Patent
Safnuk

(10) Patent No.: US 12,373,716 B2
(45) Date of Patent: Jul. 29, 2025

(54) AUTOMATED SYNCHRONIZATION OF CLONE DIRECTED ACYCLIC GRAPHS

(71) Applicant: Ford Global Technologies, LLC, Dearborn, MI (US)

(72) Inventor: Bradley David Safnuk, Victoria (CA)

(73) Assignee: Ford Global Technologies, LLC, Dearborn, MI (US)

( * ) Notice: Subject to any disclaimer, the term of this patent is extended or adjusted under 35 U.S.C. 154(b) by 932 days.

(21) Appl. No.: 17/072,757

(22) Filed: Oct. 16, 2020

(65) Prior Publication Data

US 2022/0121974 A1    Apr. 21, 2022

(51) Int. Cl.
| | |
|---|---|
| *G06N 7/01* | (2023.01) |
| *G06N 3/045* | (2023.01) |
| *G06N 3/08* | (2023.01) |
| *G06N 3/084* | (2023.01) |
| *G06N 3/098* | (2023.01) |

(52) U.S. Cl.
CPC ............ *G06N 7/01* (2023.01); *G06N 3/045* (2023.01); *G06N 3/08* (2013.01); *G06N 3/084* (2013.01); *G06N 3/098* (2023.01)

(58) Field of Classification Search
CPC ............ G06N 7/01; G06N 3/045; G06N 3/08; G06N 3/084; G06N 3/098; G06N 3/04; G06F 16/9024; G06F 16/90348
See application file for complete search history.

(56) References Cited

U.S. PATENT DOCUMENTS

| | | | |
|---|---|---|---|
| 8,229,968 B2 | 7/2012 | Wang et al. | |
| 9,811,775 B2 | 11/2017 | Krizhevsky et al. | |
| 10,325,340 B2 | 6/2019 | Wu et al. | |
| 10,540,588 B2 | 1/2020 | Burger et al. | |
| 10,846,245 B2 | 11/2020 | Islam et al. | |
| 2017/0038919 A1* | 2/2017 | Moss | ............... G06F 3/0482 |

(Continued)

FOREIGN PATENT DOCUMENTS

| | | | |
|---|---|---|---|
| CN | 110941494 A | 3/2020 | |
| WO | 2016-186801 A1 | 11/2016 | |
| WO | WO-2019042571 A1 * | 3/2019 | ............ G06N 20/00 |

OTHER PUBLICATIONS

Lazo, Visual intuition on ring-Allreduce for distributed Deep Learning, Towards Data Science, 2019 (Year: 2019).*

(Continued)

*Primary Examiner* — Kakali Chaki
*Assistant Examiner* — Michael H Hoang
(74) *Attorney, Agent, or Firm* — Christopher Storms; Kilpatrick Townsend & Stockton LLP

(57) ABSTRACT

A method is disclosed for synchronization of clone directed acyclic graphs. The method can include identifying a directed acyclic graph ("DAG") including a plurality of vertices linked in pairwise relationships via a plurality of edges. At least one clone DAG can be created, which at least one clone DAG can be identical to at least a portion of the DAG. For each of the vertices of the DAG, a corresponding clone vertex from the clone vertices of the at least one clone DAG can be identified. Aggregate gradient data can be calculated based on gradient data from each of the clone vertices and its corresponding vertex in the DAG, and at least one weight of the DAG and of the at least one clone DAG can be updated based on the aggregate gradient data.

16 Claims, 13 Drawing Sheets

(56) References Cited

U.S. PATENT DOCUMENTS

| | | | |
|---|---|---|---|
| 2019/0042946 A1* | 2/2019 | Sur | G06N 3/04 |
| 2019/0114534 A1 | 4/2019 | Teng et al. | |

OTHER PUBLICATIONS

Qi Intro Distributed Deep Learning_Xiandong, https://xiandong79.github.io/ 2017 (Year: 2017).*

Zhao, Sparse Allreduce: Efficient Scalable Communication for Power-Law Data, arXiv, 2013 (Year: 2013).*

Naumov, Maxim, Alysson Vrielink, and Michael Garland. "Parallel depth-first search for directed acyclic graphs." Proceedings of the Seventh Workshop on Irregular Applications: Architectures and Algorithms. 2017. https://dl.acm.org/doi/pdf/10.1145/3149704.3149764 (Year: 2017).*

Shi, S., et al., "A DAG Model of Synchronous Stochastic Gradient Descent in Distributed Deep Learning", 2018 IEEE 24th International Conference on Parallel and Distributed Systems (ICPADS), Last revised on Oct. 31, 2018, 8 pages, arXiv:1805.03812v3.

Eustace, P., et al., "SpiNNaker: A 1-W 18-Core System-on-Chip for Massively-Parallel Neural Network Simulation," in IEEE Journal of Solid-State Circuits, vol. 48, No. 8, pp. 1943-1953, Aug. 2013, DOI: 10.1109/JSSC.2013.2259038.

Takahiro, S., et al., "Structure discovery of deep neural network based on evolutionary algorithms," 2015 IEEE International Conference on Acoustics, Speech and Signal Processing (ICASSP), Brisbane, QLD, 2015, pp. 4979-4983, doi: 10.1109/ICASSP.2015.7178918.

Hedge, V., et al., "Parallel and Distributed Deep Learning", (2016), 8 pages.

Ben-Nun, T., et al., "Demystifying Parallel and Distributed Deep Learning: An In-depth Concurrency Analysis", ACM Computing Surveys, vol. 52, Issue 4, Article 65, (Last revised Sep. 15, 2018), 43 pages. arXiv:1802.09941v2.

Zhang, J., et al., "A Parallel Strategy for Convolutional Neural Network Based on Heterogeneous Cluster for Mobile Information System", Hindawi, Mobile InformationSystems, vol. 2017, Article ID 3824765, published Mar. 21, 2017, 13 pages, https://doi.org/10.1165/2017/3824765.

Costa et al., "Evaluating the performance of convolutional neural networks with direct acyclic graph architectures in automatic segmentation of breast lesion in US images." BMC Medical Imaging 19 (2019): 1-13. (Year: 2019).

Mayer et al., "The TensorFlow partitioning and scheduling problem: it's the critical path!.", In Proceedings of the 1st Workshop on Distributed Infrastructures for Deep Learning (pp. 1-6). (Year: Dec. 2017).

U.S. Appl. No. 17/072,709, filed Oct. 16, 2020, Non-Final Office Action mailed Jul. 28, 2023, all pages.

U.S. Appl. No. 17/072,709, Final Office Action, Mailed On Mar. 28, 2024, 46 pages.

U.S. Appl. No. 17/072,709, Non-Final Office Action, Mailed On Nov. 6, 2024, 23 pages.

Abadi et al., "TensorFlow: Large-Scale Machine Learning on Heterogeneous Distributed Systems", Available Online at: https://arxiv.org/pdf/1603.04467, Mar. 16, 2016, pp. 1-19.

Veeramanikandan et al., "Data Flow and Distributed Deep Neural Network Based Low Latency IoT-edge Computation Model for Big Data Environment", Engineering Applications of Artificial Intelligence, vol. 94, No. 2, Sep. 2020.

* cited by examiner

AUTOMATED SYNCHRONIZATION OF CLONE DIRECTED ACYCLIC GRAPHS

BACKGROUND

Computer use is increasingly dominating engineering design. This has improved design quality, but new design challenges are stretching limits of current computing systems. For example, a computer can be used to simulate airflow over the exterior body of a car. To generate a useful simulation, this requires massive amounts of input data and calculations. In addition to the sheer data volume for such a simulation, as the relationship between the input data and the outputs may be complex, the computational load for such a simulation may also be massive.

Such difficulties can be addressed via distributed computing. Currently, distributed computing operates according to a master-slave model in which one node maintains an overview of, and control of, computing operations performed by slaves. The slaves execute operations upon receiving instruction from the master but have no overview or knowledge of operations performed by other slaves alone or in aggregate. Such master-slave configurations may have considerable benefits but drawbacks may also be present. Specifically, such configurations may rely on heavy user involvement in programming the operation of the slaves and in programming the master's control of the slaves. This near-custom program may limit flexibility of computing according to a master-slave model as any change in configuration or operation of one or several nodes in the distributed computing network may desire re-programming.

In light of the growing computing demands and the limitations of current methods of distributed computing, new and improved methods of distributed computing, and specifically of distributed training may be desired.

SUMMARY

In some embodiments, a method is disclosed for training and utilizing massively parallel neural networks. A distributed computing system may be configured to perform various operations. The distributed computing system may divide a directed acyclic graph ("DAG") that comprises a plurality of vertices linked in pairwise relationships via a plurality of edges among a plurality of nodes. Each node may comprise a computing device. The distributed computing system may provide a map of the DAG that described a flow of data through the vertices to each of the vertices of the DAG. The distributed computing system may perform a topological sort of the vertices of the DAG and may traverse the DAG. In some embodiments, the distributed computing system can create at least one clone DAG identical to the DAG and/or to a portion of the DAG, the clone DAG comprising a plurality of clone vertices, identify a corresponding vertex in the DAG for each of the clone vertices, calculating aggregate gradient data based on gradient data from each of the clone vertices and its corresponding vertex in the DAG during training of the DAG and the clone DAG, and update at least one weight of the DAG and the clone DAG based on the aggregate gradient data. In some embodiments, one of a plurality of vertices of the DAG can be an entry vertex, and in some embodiments, the distributed computing system can identify the nodes underlying the DAG, generate a subordinate DAG in the entry vertex, the subordinate DAG including a plurality of subordinate vertices, each of the plurality of subordinate vertices corresponding to a one of the nodes underlying the DAG, receive data and metadata at the entry vertex, deliver the data to a next vertex in the DAG, and communicating the metadata to nodes underlying the DAG via the subordinate DAG.

In other embodiments, a system is disclosed for training and utilizing massively parallel neural networks. The system may include one or more processors and may include one or more memories storing computer-executable instructions that, when executed by the one or more processors, configure the one or more processors to perform various operations. The one or more processors may divide a directed acyclic graph ("DAG") that comprises a plurality of vertices linked in pairwise relationships via a plurality of edges among a plurality of nodes. Each node may comprise a computing device. The one or more processors may provide a map of the DAG that described a flow of data through the vertices to each of the vertices of the DAG. The one or more processors may perform a topological sort of the vertices of the DAG and may traverse the DAG.

In some embodiments, a method is disclosed for training and utilizing cloned neural networks. A computing system may be configured to perform various operations. The computing system may identify a directed acyclic graph ("DAG"), which DAG can include a plurality of vertices linked in pairwise relationships via a plurality of edges among. The computing system can create at least one clone DAG identical to the DAG and/or identical to a portion of the DAG, which at least one clone DAG can include a plurality of clone vertices. The computing system can, for each of the vertices of the DAG, identify a corresponding clone vertex from the clone vertices of the at least one clone DAG, and calculate aggregate gradient data based on gradient data from each of the clone vertices and its corresponding vertex in the DAG. The computing system can update at least one weight of the DAG and of the at least one clone DAG based on the aggregate gradient data.

In some embodiments, the computing system can identify the vertices of the DAG, and aggregate gradient data based on gradient data from each of the clone vertices and its corresponding vertex in the DAG can be calculated during training. In some embodiments, identifying the corresponding clone vertex from the clone vertices of the at least one clone DAG can include applying incrementing naming across the clone vertices of the at least one clone DAG, notifying vertices of the DAG of their corresponding clone vertices of the at least one clone DAG; and notifying clone vertices of the at least one clone DAG of their corresponding vertices of the DAG.

In some embodiments, training each of the DAG and the at least one clone DAG includes ingesting first data into the DAG and ingesting second data into the at least one clone DAG, performing a forward pass through each of the DAG and the at least one clone DAG, and performing a backward pass through each of the DAG and the at least one clone DAG. The first data and the second data can be non-identical.

The computing system can further generate a gradient for each vertex of the DAG and for each of the clone vertices of the at least one clone DAG. The computing system can exchange vertex gradients between corresponding vertices of the DAG and of the at least one clone DAG. In some embodiments, calculating aggregate gradient data based on gradient data from each of the clone vertices and its corresponding vertex in the DAG includes calculating mean gradient data. In some embodiments, updating at least one weight of the DAG and of the at least one clone DAG based on the aggregate gradient data can be performed according to synchronous gradient updates. In some embodiments, updating at least one weight of the DAG and of the at least one clone DAG based on the aggregate gradient data can be performed according to asynchronous gradient updates.

In other embodiments, a system is disclosed for training neural networks. The system may include one or more processors and may include one or more memories storing computer-executable instructions that, when executed by the one or more processors, configure the one or more processors to perform various operations. The one or more processors can identify a DAG, including a plurality of vertices linked in pairwise relationships via a plurality of edges among, and create at least one clone DAG identical to the DAG and/or to a portion of the DAG, the at least one clone DAG including a plurality of clone vertices. The one or more processors can identify a corresponding clone vertex from the clone vertices of the at least one clone DAG for each of the vertices of the DAG, train each of the DAG and the at least one clone DAG, which training can include calculating aggregate gradient data based on gradient data from each of the clone vertices and its corresponding vertex in the DAG, and update at least one weight of the DAG and of the at least one clone DAG based on the aggregate gradient data.

In some embodiments, the one or more processors can identify the vertices of the DAG, and aggregate gradient data based on gradient data from each of the clone vertices and its corresponding vertex in the DAG can be calculated during training. In some embodiments, identifying the corresponding clone vertex from the clone vertices of the at least one clone DAG can include applying incrementing naming across the clone vertices of the at least one clone DAG, notifying vertices of the DAG of their corresponding clone vertices of the at least one clone DAG, and notifying clone vertices of the at least one clone DAG of their corresponding vertices of the DAG. In some embodiments, training each of the DAG and the at least one clone DAG includes ingesting first data into the DAG and ingesting second data into the at least one clone DAG, performing a forward pass through each of the DAG and the at least one clone DAG, and performing a backward pass through each of the DAG and the at least one clone DAG. The first data and the second data can be identical or can be non-identical.

In some embodiments, the one or more processors can generate a gradient for each vertex of the DAG and for each of the clone vertices of the at least one clone DAG. In some embodiments, the one or more processors can exchange vertex gradients between corresponding vertices of the DAG and of the at least one clone DAG. In some embodiments, calculating aggregate gradient data based on gradient data from each of the clone vertices and its corresponding vertex in the DAG can include calculating mean gradient data. In some embodiments, updating at least one weight of the DAG and of the at least one clone DAG based on the aggregate gradient data can be performed according to synchronous gradient updates. In some embodiments, updating at least one weight of the DAG and of the at least one clone DAG based on the aggregate gradient data can be performed according to asynchronous gradient updates.

In some embodiments, a method is disclosed for training and utilizing cloned neural networks. A computing system may be configured to perform various operations. The computing system can identify a directed acyclic graph ("DAG") overlaying a plurality of nodes, the DAG can include a plurality of vertices linked in pairwise relationships via a plurality of edges among, which one of the plurality of vertices of the DAG can be an entry vertex, and the each of the plurality of nodes can be a computing device. The computing system can identify the nodes underlying the DAG, and generate a subordinate DAG in the entry vertex, the subordinate DAG including a plurality of subordinate vertices, each of the plurality of subordinate vertices corresponds to a one of the nodes underlying the DAG. The computing system can receive data and metadata at the entry vertex, deliver the data to a next vertex in the DAG, and communicate the metadata to nodes underlying the DAG via the subordinate DAG.

In some embodiments, the data received at the entry vertex can be training data, and in some embodiments, the data received at the entry vertex can be one batch of training data from a plurality of batches of training data. In some embodiments, the metadata received at the entry vertex can indicate that the received batch is a last batch, and/or can indicate a position of the received batch within the plurality of batches.

In some embodiments, the computing system can generate communication links between each of the subordinate vertices and the corresponding node. In some embodiments, delivering data to the next vertex in the DAG enables traversal of the DAG, and communicating the metadata to nodes underlying the DAG via the subordinate DAG can include traversing the subordinate DAG. In some embodiments, the computing system can provide a map of the DAG to each of the vertices of the DAG, which map describes a flow of data through the vertices, and perform a topological sort of the vertices of the DAG, which topological sort can be a deterministic topological sort, and which deterministic topological sort controls an order of operations for traversing the DAG. In some embodiments, the computing system can identify an edge linking separate nodes, and insert a data exchange vertex between the separate nodes, which data exchange vertex can have a recursive DAG structure and can include a send vertex and a receive vertex.

In other embodiments, a system is disclosed for training neural networks. The system may include one or more processors and may include one or more memories storing computer-executable instructions that, when executed by the one or more processors, configure the one or more processors to perform various operations. The one or more processors can identify a directed acyclic graph ("DAG") overlaying a plurality of nodes, the DAG including a plurality of vertices linked in pairwise relationships via a plurality of edges. In some embodiments, one of the plurality of vertices of the DAG can be an entry vertex, and each of the plurality of nodes can be a computing device. The one or more processors can identify the nodes underlying the DAG, and generate a subordinate DAG in the entry vertex, the subordinate DAG including a plurality of subordinate vertices, each of the plurality of subordinate vertices corresponds to a one of the nodes underlying the DAG. The one or more processors can receive data and metadata at the entry vertex, deliver the data to a next vertex in the DAG, and communicate the metadata to nodes underlying the DAG via the subordinate DAG.

In some embodiments, the data received at the entry vertex can include training data, and in some embodiments, the data received at the entry vertex can be one batch of training data from a plurality of batches of training data. In some embodiments, the metadata received at the entry vertex indicates that the received batch is a last batch, and/or indicates a position of the received batch within the plurality of batches. In some embodiments, the one or more processors can generate communication links between each of the subordinate vertices and the corresponding node. In some embodiments, delivering data to the next vertex in the DAG enables traversal of the DAG, and communicating the metadata to nodes underlying the DAG via the subordinate DAG comprises traversing the subordinate DAG.

In some embodiments, the one or more processors can provide a map of the DAG to each of the vertices of the DAG, which map describes a flow of data through the vertices, and perform a topological sort of the vertices of the DAG, which topological sort can be a deterministic topological sort, and which deterministic topological sort controls an order of operations for traversing the DAG. In some embodiments, the one or more processors can identify an edge linking separate nodes, and insert a data exchange vertex between the separate nodes, which data exchange vertex can be a recursive DAG structure including a send vertex and a receive vertex.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Building, training and utilizing a neural network that exceeds the compute and/or memory capacity of a single machine is extraordinarily complex. Not only does the processing on different worker nodes need to be precisely synchronized, but there are also significant and complex communication patterns between different nodes.

Implementing such a neural network with existing frameworks and tools is difficult, time consuming, and brittle, with even small changes to the network architecture requiring substantial changes to the underlying code. Further, after training a neural network, there needs to be a mechanism for loading the weights and using them to make predictions on new data, but typically on a different number of machines and/or different input sizes than was used to train the model. Current methods would require a significant overhaul to the code that was used for training to support such a use case.

The present disclosure relates to systems and methods for improving aspects of the directed acyclic graphs (DAGs). This includes improving distribution of a DAG across multiple computing devices (nodes), cloning a DAG and enhancing communication between the DAG and clones, and enhancing the ability of an entry vertex in a DAG to communicate with any downstream nodes.

Certain aspects and examples of the present disclosure relate to training and utilizing massively parallel neural networks by using a distributed computing system to traverse one or more directed acyclic graphs (DAGs) across one or more nodes. The distributed computing system may include a set of nodes, that may be typical computing devices, that may include a set of vertices and edges of an overall DAG. The overall DAG may form a portion of a neural network, and the overall DAG may include a subset of DAGs including, but not limited to, cloned DAGs. The vertices may be linked by the edges, and, in some examples, some vertices may be linked by edges over different nodes. In such cases, a data exchange vertex may be inserted by the computing system for facilitating data transfer between the nodes. The data exchange vertex may be configured to transmit tensors between different nodes of the distributed computing system. The distributed computing system may traverse the overall DAG and may be configured to traverse the subset of DAGs and cloned DAGs while calculating gradients. The distributed computing system may update weights of the overall DAG or of the subset of DAGs based at least in part on calculating the gradients.

Figure 1:
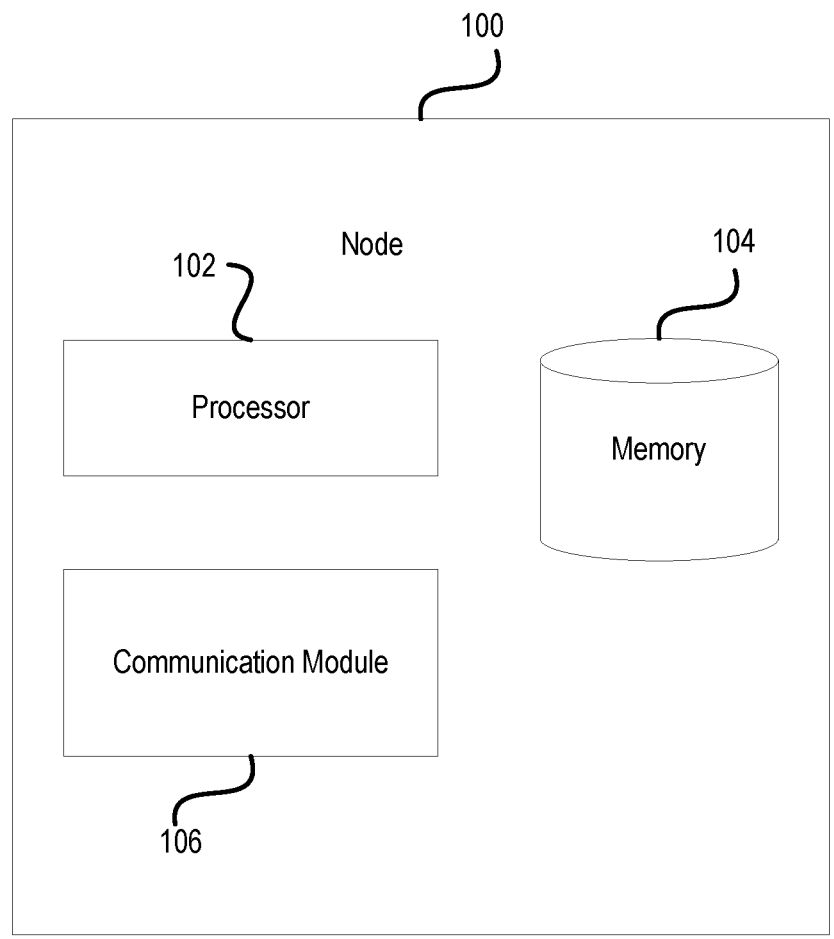
FIG. 1 is a block diagram of an example node of a distributed computing system, according to some embodiments.

FIG. 1 is a block diagram of an exemplary node 100 of a distributed computing system, according to some embodiments. The exemplary node 100 may include a processor 102 a memory 104, and a communication module 106. In some examples, the exemplary node 100 may be a computing device and may function as a typical computing device that includes a processor 102 and a memory 104. In some examples, the exemplary node 100 may be a computer, a server, a virtual machine, or the like. The exemplary node 100 may be standalone or may be one of a set of nodes in a distributed computing system. The set of nodes in the distributed computing system can be connected, with a wired connection or a wireless connection, via a network for allowing distributed computing to occur. In some examples in which the exemplary node 100 is in a distributed computing system with other nodes, the exemplary node 100 may be configured to generate DAGs, to traverse DAGs, to share information relating to DAGs with other nodes, and to perform any other operations suitable for training and utilizing massively parallel neural networks.

The processor 102 can be any computing device, and some examples include a processing device, a chip, a microchip, etc. Additionally, the processor 102 can perform operations of any vertex assigned to the exemplary node 100. The memory 104 can include computer-readable instructions, such as code, that are executable by the processor 102 to cause the processor 102 to perform operations. In some examples, the operations may include operations of the vertex assigned to the exemplary node 100. In other examples, the memory 104 may include a map of an overall DAG, information for sequencing operations of the overall DAG, and a location of current operations in the overall DAG. The communications module 106 may include hardware, software, or both for facilitating communication between the exemplary node 100 and other nodes. Additionally or alternatively, the communications module 106 may include a network interface card or the like.

Figure 2:
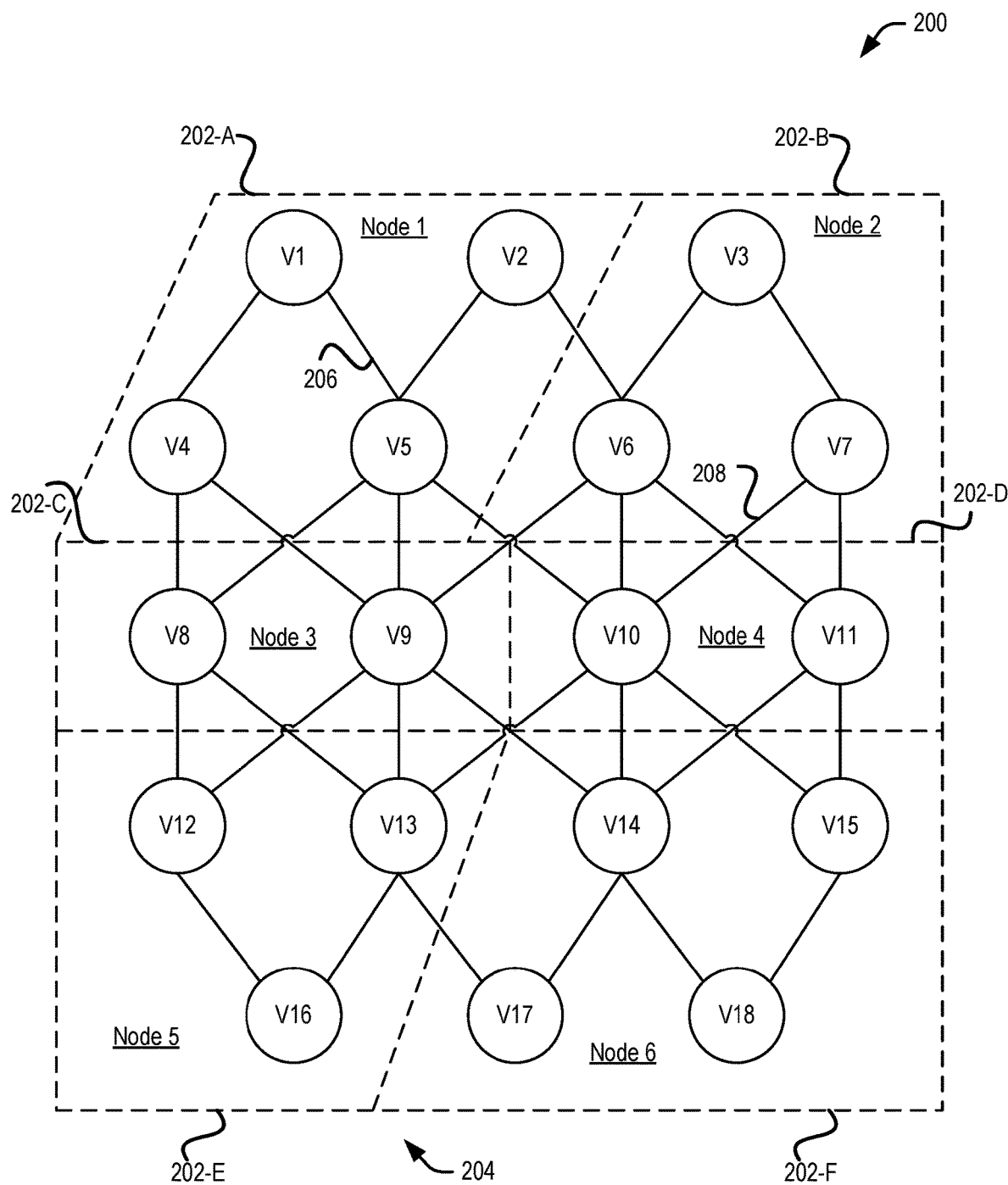
FIG. 2 is a block diagram of an example computing system that includes a set of nodes having directed acyclic graphs, according to some embodiments.

FIG. 2 is a block diagram of an exemplary embodiment of a distributed DAG 200 that is spread across multiple nodes 202-A, 202-B, 202-C, 202-D, 202-E, 202-F. These nodes 202-A, 202-B, 202-C, 202-D, 202-E, 202-F together form a computing system 204 that performs the operations of the distributed DAG 200, and specifically, each node 202-A, 202-B, 202-C, 202-D, 202-E, 202-F, performs the operation(s) of the one or several vertices of that node 202-A, 202-B, 202-C, 202-D, 202-E, 202-F.

As illustrated in the distributed DAG 200, there are six nodes 202 corresponding to node 1, node 2, node 3, node 4, node 5, and node 6, respectively. Each node of the nodes 202 may be similar or identical to the exemplary node 100 of FIG. 1. Each node of the nodes 202 may include one or more DAGs that include a certain number of vertices and edges. The nodes 202 may include any suitable number of vertices and edges for representing the one or more DAGs that may be desired to be traversed.

As illustrated in the distributed DAG 200, there are 18 vertices with 32 edges linking the vertices together. In some examples, the 18 vertices and the 32 edges may represent a DAG generated or received by the computing system 204, and the computing system 204 may subsequently determine an order in which the 18 vertices are desired to be traversed. Traversal of the distributed DAG 200 may involve moving over junctions between nodes, and in this case, the distributed computing system may insert a data exchange vertex (described in FIG. 3) to facilitate information transfer between the nodes. Among the 32 edges depicted in FIG. 2, the distributed DAG 200 shows two edges 206 and 208 of particular importance. Specifically, a problem may arise when a DAG is distributed across multiple independent nodes, namely how to facilitate communication between these nodes and how to transmit data between nodes.

As depicted in the distributed DAG 200, the edge 206 links vertex V1 and vertex V5, and the edge 208 links vertex V7 and vertex V10. The vertex V1 and the vertex V5 are contained in the node 1 202-A, the vertex V7 is contained in the node 202-B, and the vertex V10 is contained in the node 202-D. In an example in which the distributed DAG 200 includes the edges 206 and 208, the computing system 204 may simply move along the edge 206 without any extra actions. But, the edge 208 connects two nodes, and thus crosses a node boundary. In some embodiments, edges transiting node boundaries can be identified and a data exchange vertex can be inserted at that boundary. Thus, a data exchange vertex (not shown) can be inserted in edge 208 at a junction of the node 202-B and the node 202-D. The data exchange vertex may facilitate data transfer between the node 202-B and the node 202-D and may result in a faster or more efficient traversal of the DAG.

Figure 3:
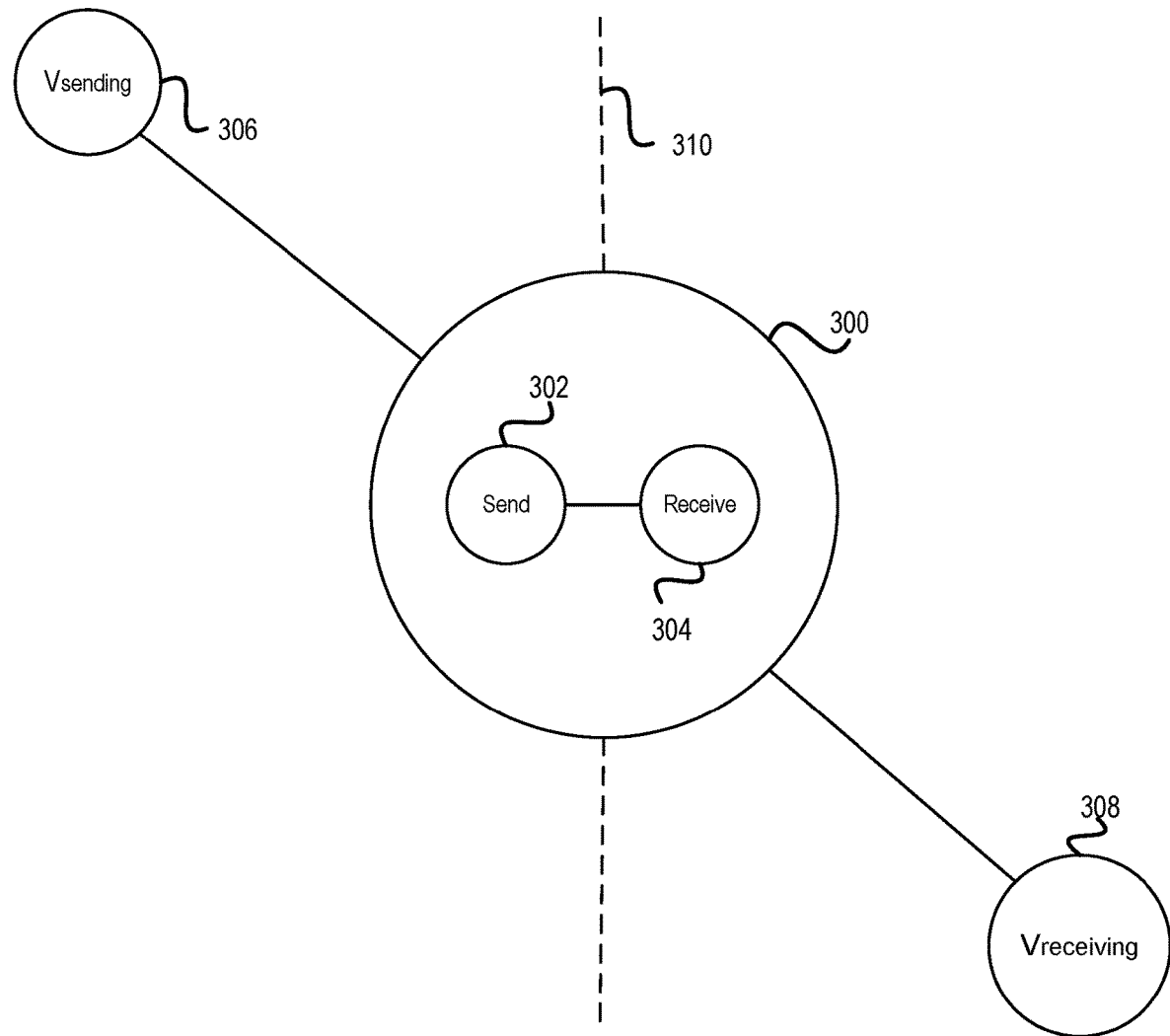
FIG. 3 is a block diagram of an example data exchange vertex, according to some embodiments.

FIG. 3 is a block diagram of an exemplary data exchange vertex 300, according to some embodiments. A distributed computing system (e.g. the computing system 204 of FIG. 2) may insert the exemplary data exchange vertex 300, and the exemplary data exchange vertex 300 may be similar or identical to the data exchange vertex describe above in reference to FIG. 2. The exemplary data exchange vertex 300 may include a recursive DAG structure and may be a mini-DAG that may include two vertices and one edge. As illustrated in FIG. 3, the exemplary data exchange vertex 300 can include a send vertex 302 and a receive vertex 304. The exemplary data exchange vertex 300 may connect a sending vertex 306 that is contained in one node to a receiving vertex 308 that is contained in a different node. The exemplary data exchange vertex 300 may be located on a junction 310 of the one node and the different node.

The sending vertex 306 may desire to transmit information to the receiving vertex 308 and may transmit information to the exemplary data exchange vertex 300 for facilitating data exchange across nodes. The sending vertex 306 may transmit information to the exemplary data exchange node 300, and the send vertex 302 may receive the information and perform any relevant operations for facilitating data transfer across the nodes. The send vertex 302, in response to receiving the information from the sending vertex 306, may transmit the information to the receive vertex 304 that is included in the exemplary data exchange vertex 300. The receive vertex 304, in response to receiving the information from the send vertex 302, may transmit the information to the receiving vertex 308 that is included in the node that is different from the node that includes the sending vertex 306.

The distributed computing system may, in response to traversing an edge of an overall DAG, insert the exemplary data exchange vertex 300. The edge may link two vertices that may be included in two different nodes. The distributed computing system may insert the exemplary data exchange vertex 300 at a junction of the two different nodes for facilitating data transfer between the two different nodes. In some examples, information in the data that is transferred between the two different nodes across the exemplary data exchange vertex 300 may include a tensor. The tensor may include information about the overall DAG that the distributed computing system may desire to traverse, the information including a DAG map, operations to perform based on the overall DAG, etc. The sending vertex 306 may transmit the tensor to the send vertex 302 of the exemplary data exchange vertex 300, and, in response to receiving the tensor, the send vertex 302 may transmit the tensor to the receive vertex 304. The receive vertex 304 may subsequently transmit the tensor to the receiving vertex 308 being in a different node compared to the sending vertex 306.

The recursive DAG structure of the exemplary data exchange vertex 300 may provide added benefits to the distributed computing system. For example, launching the exemplary data exchange vertex 300 by the distributed computing system may trigger a node of the sending vertex 306 and a node of the receiving vertex 308. This is possible since the sending vertex 306 and the receiving vertex 308 are linked in a DAG separate from the overall DAG. Triggering the nodes may cause the node of the sending vertex 306 to transmit data and may cause the node of the receiving vertex 308 to prepare to receive the data. The node of the receiving vertex 308 may subsequently receive the data. Absent the recursive DAG structure, the node of the receiving vertex 308 may not receive data.

Figure 4:
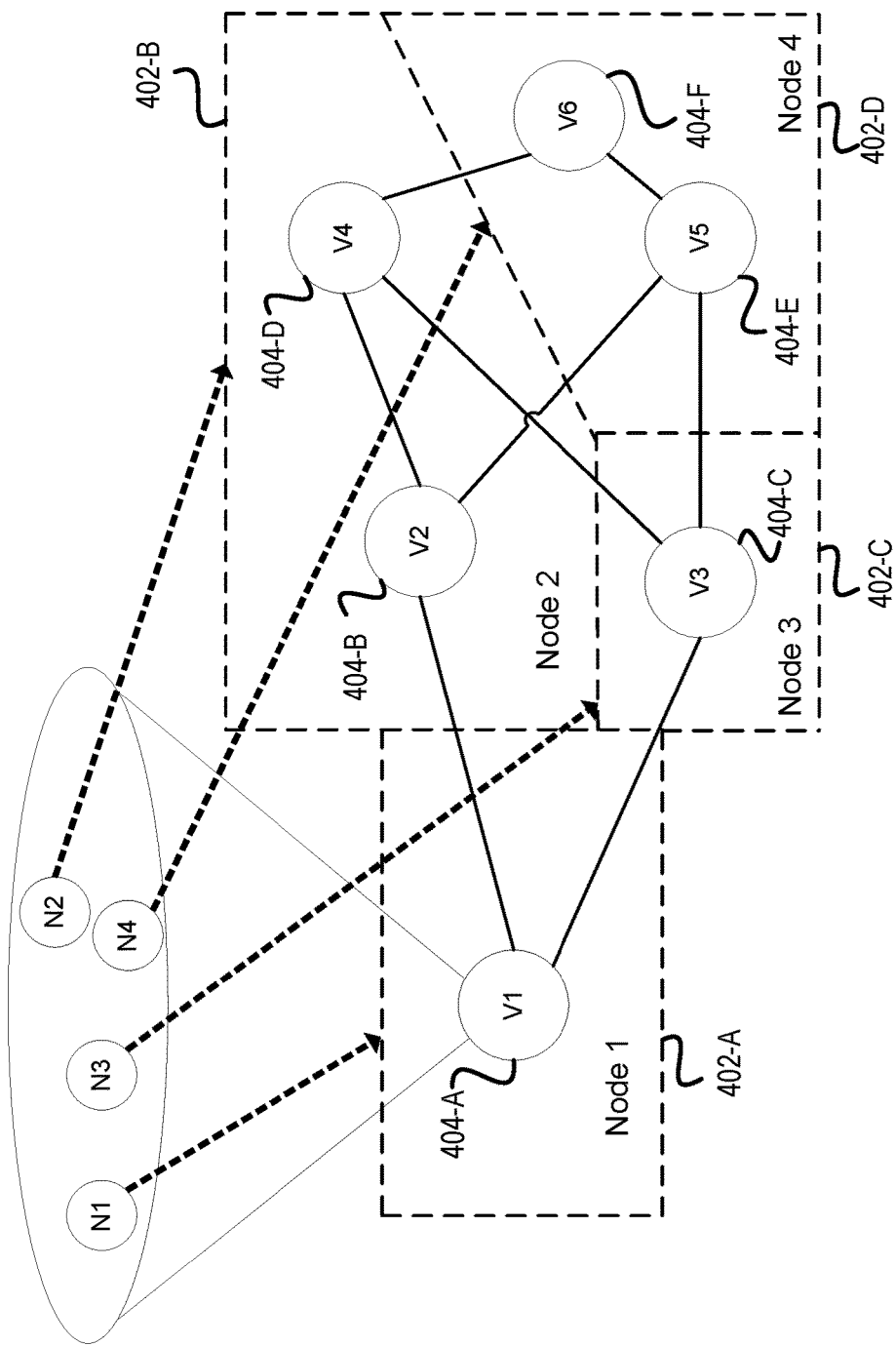
FIG. 4 is a block diagram of an embedded directed acyclic graph, according to some embodiments.

FIG. 4 is a block diagram of an embedded DAG 400, according to some embodiments. In a distributed computing system traversing an overall DAG, such as the computing system 204 of FIG. 2, information may not necessarily flow between nodes of the distributed computing system. As such, the distributed computing system may generate or receive the embedded DAG 400 that may be one example of an embedded DAG. The embedded DAG 400 may be a typical DAG, a sub-DAG of the overall DAG, etc. As illustrated in FIG. 4, the embedded DAG 400 includes four nodes 402-A, 402-B, 402-C, and 402-D, and six vertices 404-A, 404-B, 404-C, 404-D, 404-E, and 404-F. The embedded DAG 400 may include any suitable number of nodes, vertices, and edges for facilitating data transfer across nodes of the overall DAG.

The distributed computing system may generate the embedded DAG 400 by creating vertices of the embedded DAG 400 that may correspond to nodes of the overall DAG. The first vertex 404-A of the embedded DAG 400 may correspond to a first node of the overall DAG. While each vertex 404 of the embedded DAG 400 may correspond to a node of the overall DAG, more than one vertex 404 may be contained in the nodes 402 of the embedded DAG.

In response to generating the embedded DAG 400, the distributed computing system may trigger or otherwise activate the embedded DAG 400. Triggering the embedded DAG 400 may cause traversal of the embedded DAG 400 in which data may be transferred to certain nodes of the overall DAG. For example, traversal of the embedded DAG 400 may cause the vertex 404-C to transmit data or other information to a corresponding node in the overall DAG relating to traversal of the overall DAG. Some examples of the other information may include metadata relating to the overall DAG, how many more processes the nodes may be tasked to perform, that the current traversal of the overall DAG is the last set of processes that the nodes are tasked to perform, etc. Successful traversal of the embedded DAG 400 may result in each node of the nodes of the overall DAG successfully sharing information relevant to traversal of the overall DAG with other nodes of the nodes of the overall DAG.

Figure 5:
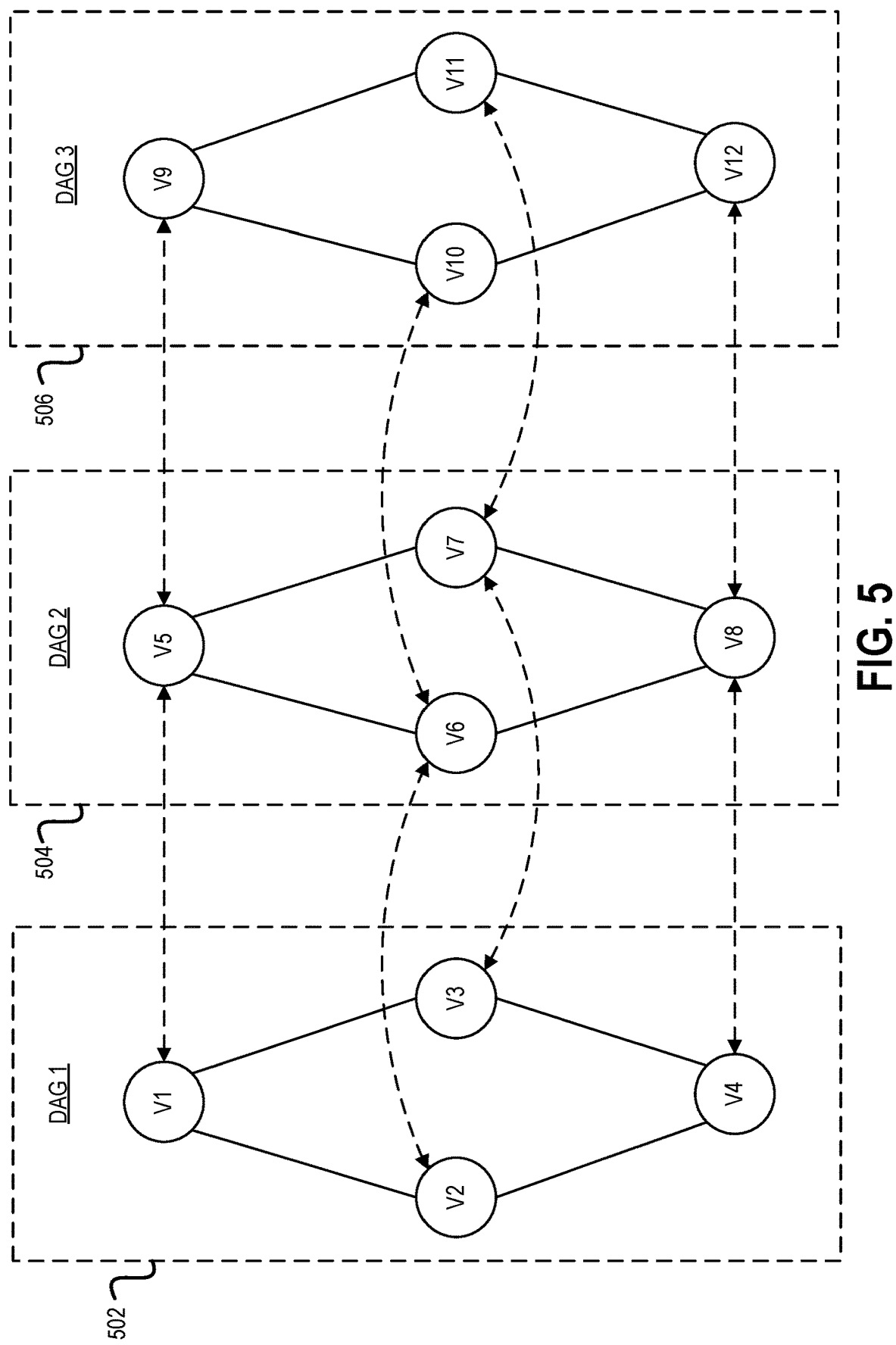
FIG. 5 is a block diagram of a directed acyclic graph and two cloned directed acyclic graphs in a distributed computing system, according to some embodiments.

FIG. 5 is a block diagram 500 of a DAG 502 and two cloned DAGs 504 and 506 in a distributed computing system, according to some embodiments. The DAG 502 may be similar or identical to an overall DAG, and, in some examples, the DAG 502 may be a subset of the overall DAG that a distributed computing system (e.g. the computing system 204 of FIG. 2) desires to traverse. The DAGs 504 and 506 may be clones of the DAG 502, meaning that the DAGs 504 and 506 may be identical to the DAG 502. Thus, in embodiments in which DAG 502 is a portion of the overall DAG, in other words, is a subset of a parent DAG, the cloned DAGs 504, 506 can be clones of the portion of the overall DAG. In some embodiments in which a parent DAG is divided into multiple portions, one or several cloned DAGs can be created for each of those portions of the parent DAG.

As illustrated in the block diagram 500, each DAG of the DAGs 502, 504, and 506 includes four vertices and four edges. While two cloned DAGs, being the DAGs 504 and 506, are shown in the block diagram 500, any suitable number of cloned DAGs may be generated or utilized for increasing parallel processing capacity.

The DAG 502 may include vertex V1, vertex V2, vertex V3, and vertex V4 and may include edges that link the vertices V1, V2, V3, and V4 together. Traversing the DAG 502 may involve executing operations at the vertices V1, V2, V3, and V4 and traversing the edges. The DAG 502 may be included in one node (e.g. node A), but the DAG 502 may be connected to other nodes (e.g. node B or node C). The distributed computing system may clone the DAG 502 to increase speed or efficiency of traversing the overall DAG.

The distributed computing system may generate the DAGs 504 and 506 that may be identical to the DAG 502. In some examples, the distributed computing system may traverse the DAGs 502, 504, and 506 in forward order and then in backward order. Specifically, the distributed computing system may traverse each of the DAG 502, the DAG 504, and the DAG 506 in a forward direction and in a backward direction. This traversing can be serial, or can be parallel.

During traversal of the DAGs 502, 504, and 506, corresponding vertices within the DAGs 502, 504, 506 may exchange or otherwise transmit and receive gradients. During or subsequent to a forward traversal of the DAGs 502, 504, and 506, the distributed computing system may calculate vertex gradients for related nodes. During or subsequent to a backwards traversal of the DAGs 502, 504, and 506, the distributed computing system may calculate reverse vertex gradients for related nodes. The distributed computing system may compare the vertex gradients to the reverse vertex gradients for updating weights in the DAGs 502, 504, and 506. Corresponding nodes within the DAGs 502, 504, 506 can share their gradients, and an average gradient can be calculate for each node in the DAGs 502, 504, 506, which average gradient can then be used for updating weights in the DAGs 502, 504, 506.

Figure 6:
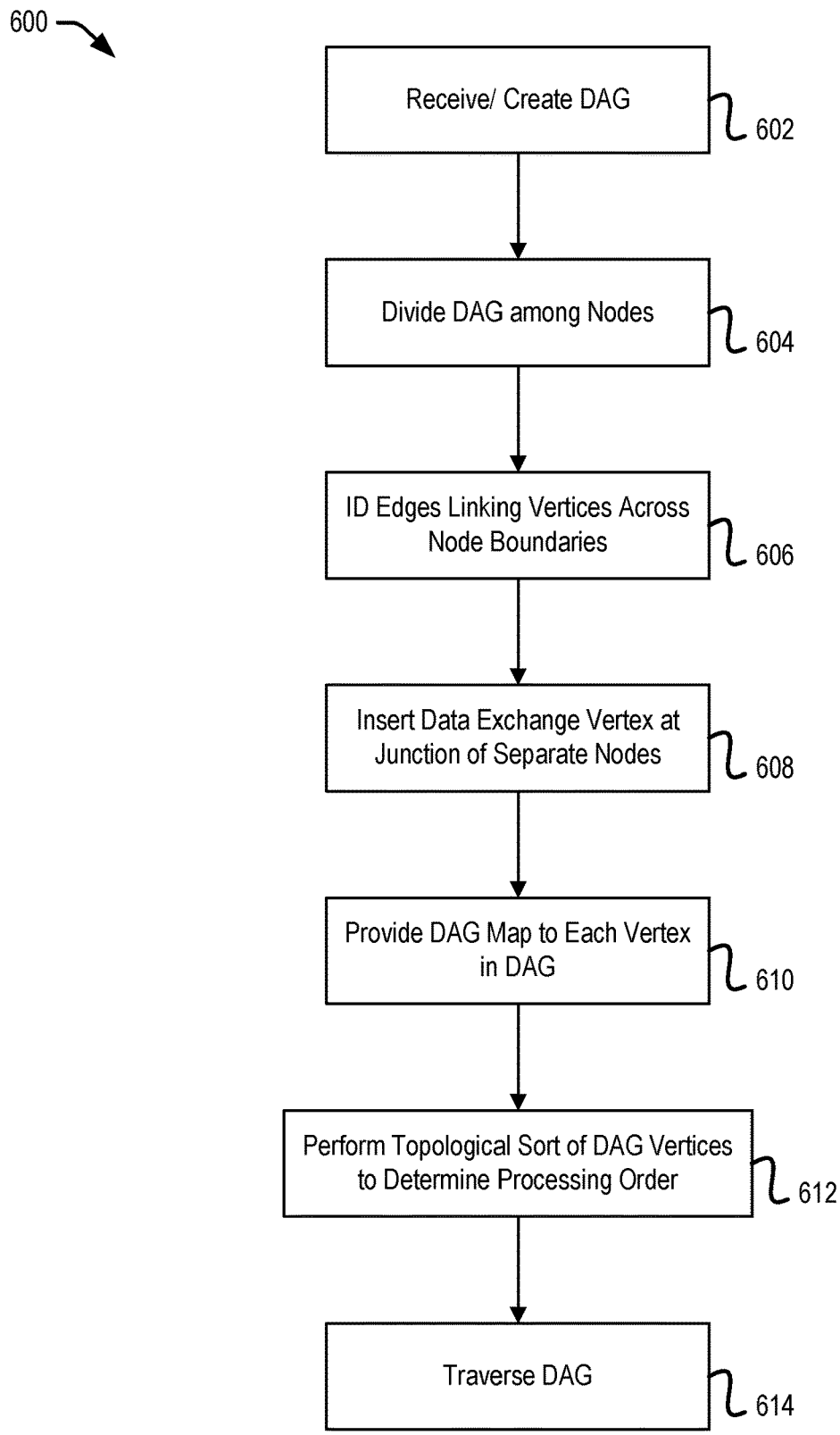
FIG. 6 is a flow chart of a process to train and utilize massively parallel neural networks, according to some embodiments.

FIG. 6 is a flow chart of a process 600 to train and utilize massively parallel neural networks, according to some embodiments. At block 602, the process 600 involves the creation or receiving of a DAG. A distributed computing system (e.g. the computing system 204 of FIG. 2) may generate the DAG based on instructions received by the distributed computing system. Additionally or alternatively, the distributed computing system may receive the DAG. The DAG may include any suitable number of vertices and edges for executing the process 600.

At block 604, the process 600 involves dividing the DAG among nodes. The computing system may include any suitable number of nodes for executing the process 600, and the DAG received or generated at block 602 may be divided among the nodes included in the computing system. For example, in a distributed computing system with three nodes, node A, node B, and node C, that receives a DAG with seven vertices, vertex i, vertex ii, vertex iii, vertex iv, vertex v, vertex vi, and vertex vii, the distributed computing system may put vertex i and vertex ii in node A, may put vertex iii, vertex iv, and vertex v in node B, and may put vertex vi and vertex vii in node C. The vertices of the DAG may be connected across nodes by the edges in any suitable fashion for executing the process 600. Additionally, the vertices may be assigned to the nodes, and this assignment may be determined through load balancing (e.g. based at least in part on expected load).

At block 606, the process 600 involves identifying edges linking vertices across boundaries. The DAG may comprise vertices and edges, and, in some examples, the vertices may be distributed among more than one node of the distributed computing system. In response to the distributed computing system dividing the DAG among the nodes, the distributed computing system may identify edges of the DAG that link vertices that are not in the same node.

At block 608, the process 600 involves inserting a data exchange vertex (e.g. the exemplary data exchange vertex 300 of FIG. 3) at a junction of separate nodes. In an example in which the distributed computing system identifies one edge that links vertices between two nodes, the distributed computing system may insert the data exchange vertex at a junction of the two nodes. The distributed computing system may insert any suitable number of data exchange vertices that correspond to an edge that links two separate nodes.

At block 610, the process 600 involves providing a DAG map to each vertex in the DAG. The DAG map may include information relating to operations to be performed by the DAG that may include an order of vertices in which the DAG will be traversed. In this example, not only the first vertex in the DAG will know the order in which the DAG will be traversed, but all vertices in the DAG will know. This may allow vertices subsequent to the first vertex in the DAG to prepare to execute tasks associated with traversing the DAG and may result in faster or more efficient execution of the DAG. In other examples, the order may be omitted, but other tasks or operations may be included that, when each vertex is notified of more incoming information relating to the other tasks or operations, may result in faster or more efficient execution of the other tasks or operations. Any suitable number of tasks or operations may be included for representing the DAG.

At block 612, the process 600 involves performing a topological sort of the vertices of the DAG to determine a processing order. Subsequent to the vertices receiving the DAG map, the distributed computing may perform a topological sort on the vertices, meaning the distributed computing system may determine the order in which the vertices are desired to be traversed. In some examples, the topological sort may be a deterministic topological sort that may determine an order of operations for traversing the DAG. The order of vertices may be similar or identical to an order of the nodes. For example, node A may include vertex i, vertex ii, and vertex iv, and node B may include vertex iii and vertex v. A DAG of this example may involve traversing the vertices in order: vertex i, vertex ii, vertex iii, vertex iv, and then vertex v. In traversing the DAG in this manner, the junction between node A and node B may be crossed more than one time, meaning that more than one data exchange vertex may be inserted by the distributed computing system.

At block 614, the process 600 involves traversing the DAG. Subsequent to topologically sorting the vertices of the DAG, the distributed computing system may traverse the DAG. Traversal of the DAG may involve executing tasks or other types of operations associated with the DAG. Traversal of the DAG may result in traversal of some or all vertices and edges in the DAG and execution of some or all operations included in the DAG. In some embodiments in which the DAG corresponds to a Neural Network, the traversing of the DAG can be a part of the training of the Neural Network.

Figure 7:
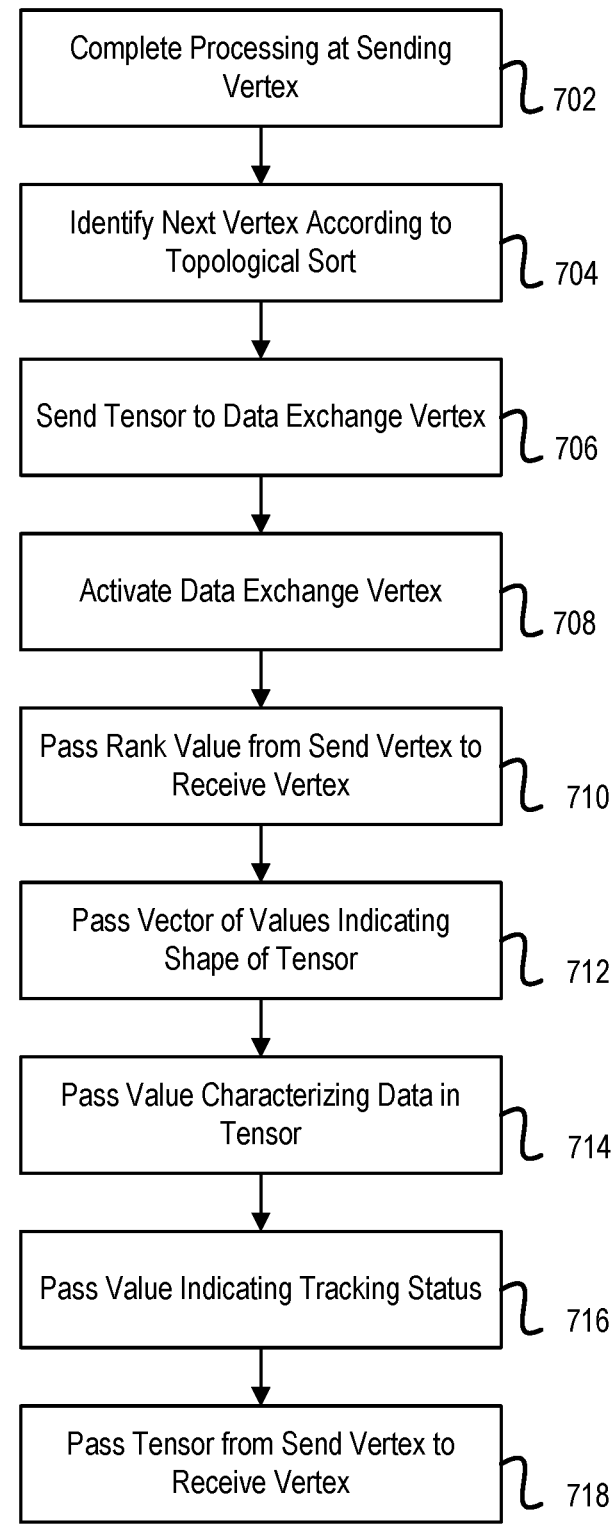
FIG. 7 is a flow chart of a process for passing a tensor across a data exchange vertex, according to some embodiments.

FIG. 7 is a flow chart of a process 700 for passing a tensor across a data exchange vertex (e.g. the exemplary data exchange vertex 300 of FIG. 3), according to some embodiments. At block 702, the process 700 involves a distributed computing system (e.g. the computing system 204 of FIG. 2) completing processing at a sending vertex (e.g. the sending vertex 306 of FIG. 3). Traversing the overall DAG may involve processing information or otherwise performing an operation at the sending vertex. Upon completion of the processing at the sending vertex, the distributed computing system may continue traversal of the overall DAG.

At block 704, the process 700 involves identifying a next vertex based on a topological sort. The distributed computing system may, in response to completing processing at the sending vertex, identify the next vertex (e.g. the receiving vertex 308 of FIG. 3) to move to in the traversal. The distributed computing system may be able to identify the next vertex based on the topological sort of the vertices that the distributed computing system may have previously completed (e.g. the topological sort performed at block 612 of the process 600).

At block 706, the process 700 involves sending tensor data to the data exchange vertex. The distributed computing system may transmit the tensor data to the data exchange vertex, and the tensor may include data pertinent to traversal of the overall DAG such as a DAG map, operations or processing to be performed at each vertex of the overall DAG, etc. The tensor may include any other, suitable, pertinent information and may be of any suitable rank or size for sending information for traversing the overall DAG.

At block 708, the process 700 involves activating the data exchange vertex. The distributed computing system may, subsequent to or prior to sending tensor data to the data exchange vertex, activate the data exchange vertex. Prior to the distributed computing system activating the data exchange vertex, the data exchange vertex may be inactive, meaning no processing is taking place at the data exchange vertex. While inactive, the data exchange vertex may not execute tasks but may be configured to receive commands such as an activation command to cause the data exchange vertex to activate.

At block 710, the process 700 involves passing a rank value from a send vertex (e.g. the send vertex 302 of FIG. 3) to a receive vertex (e.g. the receive vertex 304 of FIG. 3). The send vertex and the receive vertex may be included in the data exchange vertex. The send vertex may determine the rank value from the tensor data transmitted to the send vertex by the sending vertex, and the send vertex may transmit the rank data to the receive vertex.

At block 712, the process 700 involves passing a vector of values indicating a shape of the tensor. The send vertex may, in addition to the rank value, transmit the vector of values to the receive vertex. The rank value may indicate the shape of the tensor, which may facilitate data transfer across the data exchange vertex. The tensor may be of any suitable shape for transmitting information across two different nodes.

At block 714, the process 700 involves passing a value that characterizes data in the tensor. The send vertex may, in addition to the vector of values, transmit the value that characterizes data in the tensor to the receive vertex. The value that characterizes data in the tensor may be any suitable value for indicating a type of data included in the tensor. The data included in the tensor may describe how many bytes are occupied for each number in the tensor and may additionally include information on how to transform the bytes into a number for subsequent use.

At block 716, the process 700 involves passing a value indicating a tracking status. The send vertex may, in addition to the value that characterizes data in the tensor, transmit the value indicating the tracking status to the receive vertex. The value indicating the tracking status may be a value indicating that a gradient is desired to be passed backward through the data exchange vertex or any other suitable value for indicating the tracking status. The tracking status may indicate a progress of the overall DAG or any other suitable process that may be desired to be tracked. In some examples, the tracking status may track a gradient of a neural network.

At block 718, the process 700 involves passing the tensor from the send vertex to the receive vertex. In response to the send vertex transmitting the rank value, the vector of values indicating the shape of the tensor, the value that characterizes data in the tensor, and the value indicating the tracking status, the send vertex may transmit the tensor to the receive vertex. In response to receiving the tensor, the receive vertex may pass the tensor to the receiving vertex completing transfer of the tensor from the sending vertex in one node to the receiving vertex in a different node.

Figure 8:
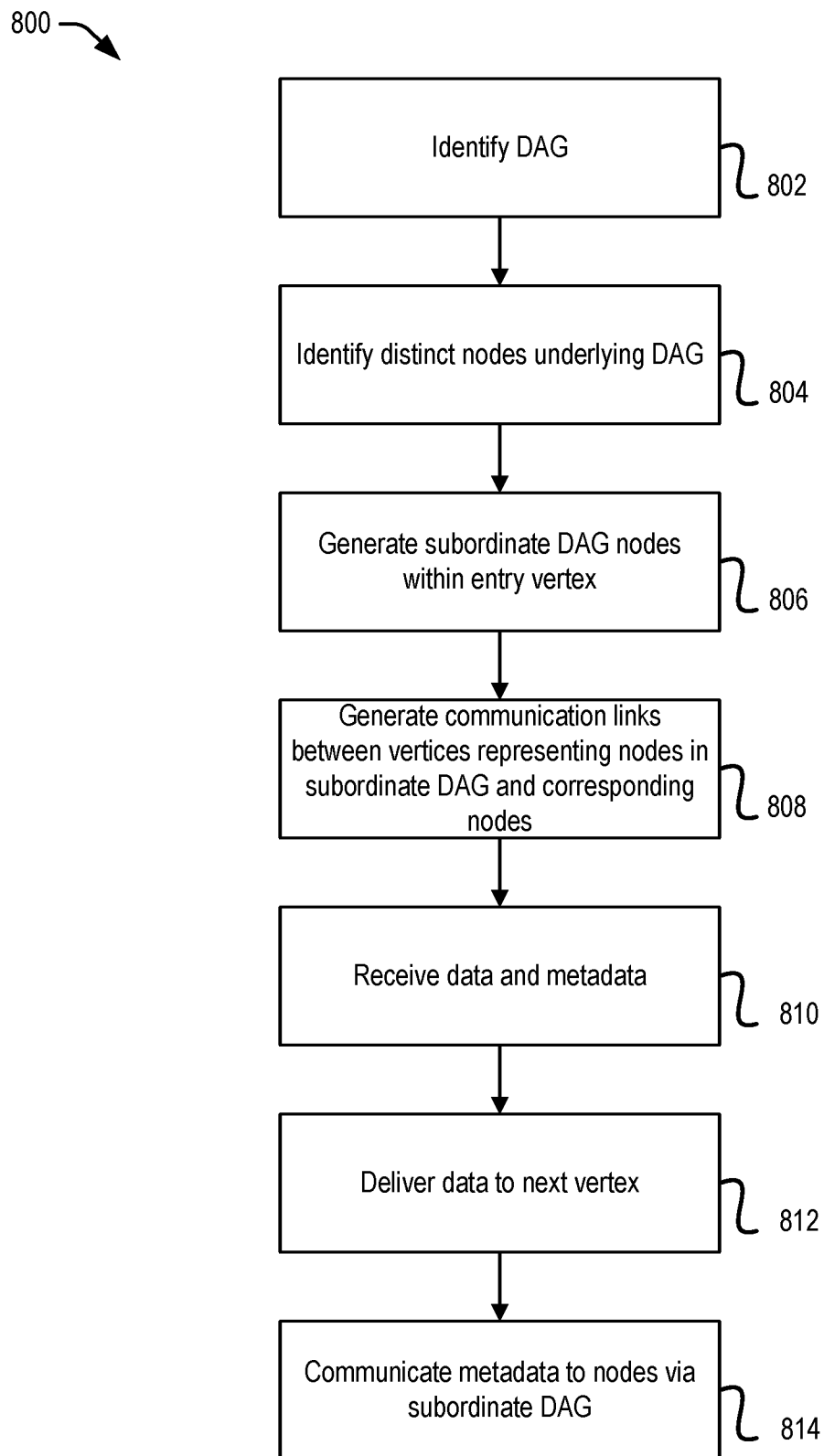
FIG. 8 is a flow chart of a process for facilitating data transfer among nodes of an overall DAG, according to some embodiments.

FIG. 8 is a flow chart of a process 800 for facilitating data transfer among nodes of an overall DAG, according to some embodiments. At block 802, the process 800 involves identifying a DAG. The identified DAG in this case may be the overall DAG that a distributed computing system (e.g. the computing system 204 of FIG. 2) desires to traverse. The distributed computing system may identify the DAG or otherwise prepare to generate or receive a subsequent DAG based on the overall DAG.

At block 804, the process 800 involves identifying distinct nodes underlying the DAG. The overall DAG may include and/or overlay any suitable number of nodes for enabling traversal of the overall DAG, and the distributed computing system may identify the nodes. The nodes may be subsequently used to determine, at least in part, a structure of the subsequent DAG, an order of the subsequent DAG, or both.

At block 806, the process 800 involves generating subordinate DAG nodes within an entry vertex. The entry vertex may be the first vertex to be traversed by the distributed computing system in the overall DAG. The subordinate DAG may be the subsequent DAG and an example of the subordinate DAG may be the embedded DAG 400 of FIG. 4. In response to identifying the distinct nodes underlying the overall DAG, the distributed computing system may begin generating the subordinate DAG by generating nodes of the subordinate DAG. The nodes of the subordinate DAG may be contained in the first vertex and may be similar or identical to the exemplary node 100 of FIG. 1. In generating the subordinate DAG nodes, the distributed computing system may additionally generate vertices of the subordinate DAG.

At block 808, the process 800 involves generating communication links between vertices of the subordinate DAG, each vertex of the vertices of the subordinate DAG corresponding to a node of the overall DAG, and the nodes of the overall DAG. In response to successful generation of the subordinate DAG having nodes and vertices, the distributed computing system may establish or otherwise generate communication links between the vertices of the subordinate DAG and the nodes of the overall DAG. The communication links may enable transfer of data or metadata between nodes of the overall DAG.

At block 810, the process 800 involves receiving data and metadata. Subsequent to establishing the communication links between the vertices of the subordinate DAG and the nodes of the overall DAG, the distributed computing system may receive, retrieve, and/or fetch data and metadata. As used herein, "receive" covers any mechanism or method whereby the data and metadata arrive at the DAG. The data and metadata may relate to traversal of the overall DAG and some examples of the data and metadata may include processes to be executed, an expected amount of subsequent information to be received, etc. The distributed computing system may ingest the received data and metadata into the subordinate DAG for facilitating transfer of the data and metadata among the nodes of the overall DAG.

In some embodiments, the received data can comprise a batch of data, which can include training data or data for processing through the DAG. In some embodiments, for example, one epoch (for training, one forward and backward pass through a complete desired set of training data, or, for generating a prediction with the DAG, one forward pass through a complete desired set of data) can be broken into a number of batches, the aggregate of which batches can comprise the complete desired set of data. In embodiments in which batches of data are passed through a DAG, such as a Neural Network as a part of training or to generate a prediction with that Neural Network, these batches are passed to an entry vertex, which entry vertex can be a first vertex in the DAG receiving the batches. The DAG can, in some embodiments, comprise a single entry vertex, and in some embodiments, the DAG can comprise a plurality of entry vertices. Along with data forming the batch, the entry vertex can receive metadata including information relating to the batch. In some embodiments, this metadata can include information such as, the position of this batch in a series of batches forming the epoch. This can include, for example, indicating that the present batch is batch number "X" of a total of "Y" batches. The metadata can include information indicating whether the batch received by the entry vertex is a last batch or a next to last batch. In some embodiments, this metadata can indicate whether further batches will be received by the entry vertex, or if no further batches will be received by the entry vertex.

The entry vertex can communicate this information to other vertices in the DAG. Having this information, other vertices within the DAG can know whether to expect receipt of further batches. The notification of other vertices in the DAG based on metadata received by the entry vertex is challenging when the vertices of the DAG are distributed among a plurality of nodes. Specifically, when all of the vertices are located on a single node underlying the DAG, this information from the metadata is easily and/or implicitly shared to the other vertices of the DAG upon receipt of this information by the entry vertex. The present provides for communication of this information from the metadata to other nodes containing vertices of the DAG via the creation of a subordinate DAG in the entry vertex as created in block 806.

At block 812, the process 800 involves delivering the data to a subsequent vertex. In response to the distributed computing system receiving and ingesting the data into the subordinate DAG, the distributed computing system may deliver the data to the subsequent vertex. In some examples, this delivery may be accomplished by simple traversal of the subordinate DAG. In other examples, the distributed computing system may, external to traversal of the subordinate DAG, deliver the data to the next vertex for enabling traversal of the subordinate DAG or of the overall DAG. Delivery of the data may additionally or alternatively enable transfer of data between the nodes of the overall DAG.

At block 814, the process 800 involves communicating metadata to the nodes of the overall DAG via the subordinate DAG. In some examples, successful traversal of the subordinate DAG by the distributed computing system may result in transferal of the metadata among the nodes of the overall DAG. The metadata may include information such as an amount of expected information or processes to subsequently receive, etc. The distributed computing system may generate any suitable number of subordinate DAGs for enabling transfer of relevant data and metadata among the nodes of the overall DAG.

Figure 9:
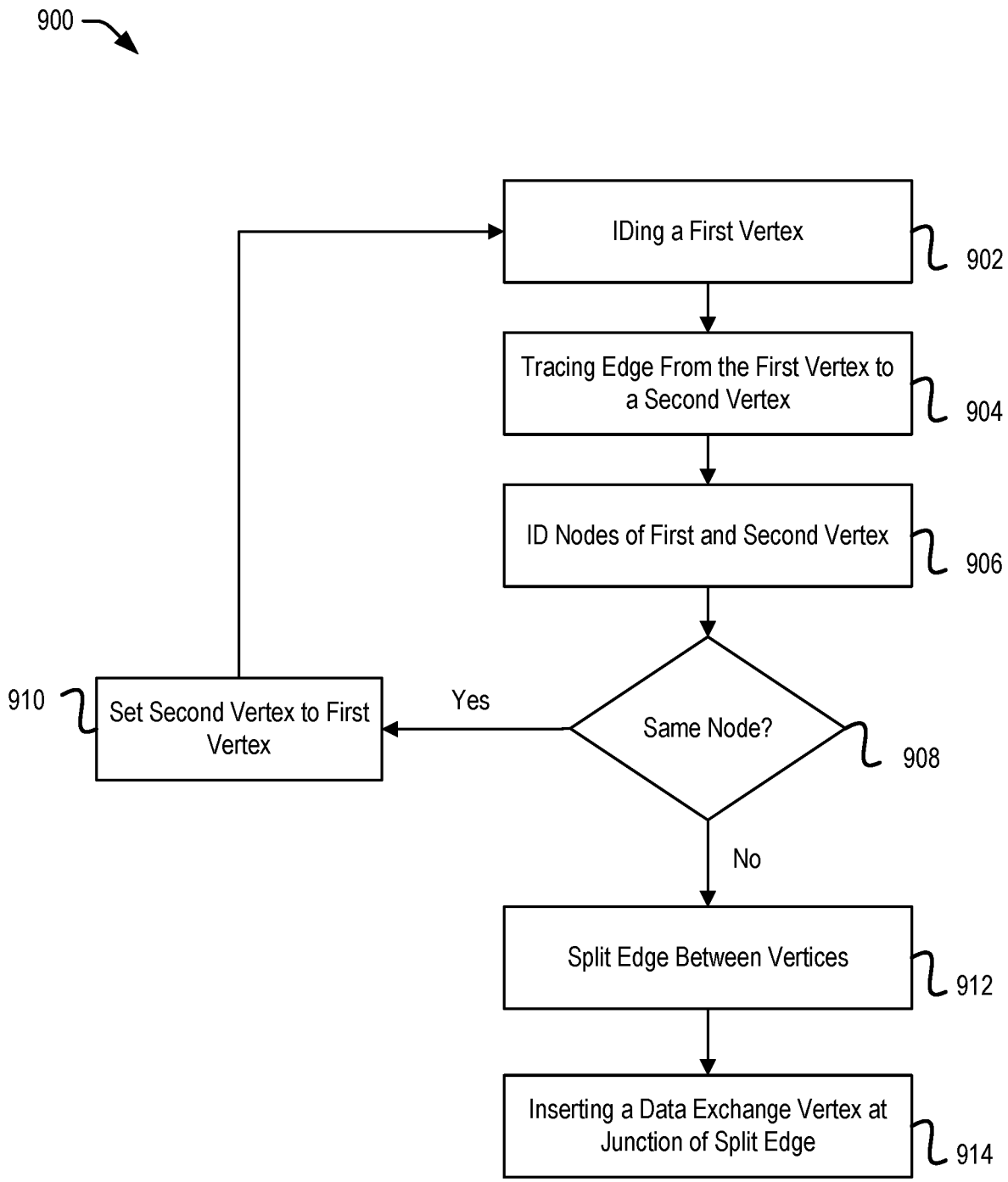
FIG. 9 is a flow chart of a process to create a data exchange vertex, according to some embodiments.

FIG. 9 is a flow chart of a process 900 to create a data exchange vertex (e.g. the exemplary data exchange vertex 300 of FIG. 3), according to some embodiments. At block 902, the process 900 involves identifying a first vertex. A distributed computing system (e.g. the computing system 204 of FIG. 2) may be configured to, when traversing an overall DAG, identify the first vertex, the first vertex being included in the overall DAG and being included in a node (e.g. the exemplary node 100 of FIG. 1). The first vertex may be linked to other vertices within the overall DAG.

At block 904, the process involves tracing an edge from the first vertex to a second vertex. The distributed computing system may be configured to trace or otherwise identify the edge that may be included in the overall DAG. The second vertex may be included in the overall DAG and the edge may link the first vertex and the second vertex. The first vertex and the second vertex may be included in the same node or in different nodes.

At block 906, the process involves identifying a node of the first vertex and a node of the second vertex, hereinafter known respectively as the first node and the second node. The distributed computing system may be configured to identify the first node and the second node. Traversal of the DAG may begin with the first vertex and progress based on an order of operations based on a topological sort (e.g. the topological sort performed at block 612 of process 600).

At block 908, the process 900 involves determining whether or not the first node and the second node are the same node. The distributed computing system may be able to determine whether the first node and the second node are the same node. In an example in which the first and the second node are the same, no further action may be desired to be taken. But, in an example in which the first and the second node are different, action may be desired to be taken to facilitate data transfer across the first node and the second node.

At block 910, the process 900 involves setting the second vertex to the first vertex. In response to determining that the first node and the second node are the same, the distributed computing system may be configured to move on to another set of vertices. In such case, the distributed computing system may set the second vertex as the first vertex, and the process 900 may start over from block 902. In other examples, the distributed computing system may start the process 900 over from block 902 identifying a first vertex that is different from the second vertex. The distributed computing system may repeat the process 900 any suitable number of times for iterating over all edges included in the overall DAG.

At block 912, the process 900 involves splitting the edge that links the first vertex and the second vertex. In response to determining that the first node and the second node are different, the distributed computing system may split the edge that links the first vertex and the second vertex. The edge may be split at a junction of the first node and of the second node for facilitating data transfer between the first node and the second node.

At block 914, the process 900 involves inserting a data exchange vertex (e.g. the exemplary data exchange vertex 300 of FIG. 3) at a junction of the split edge. Subsequent to splitting the edge at block 912, the distributed computing system may inset the data exchange vertex. The data exchange vertex may be inserted at the junction of the first node and the second node. The data exchange vertex may link the first vertex and the second vertex and may facilitate data transfer between the first node and the second node.

Figure 10:
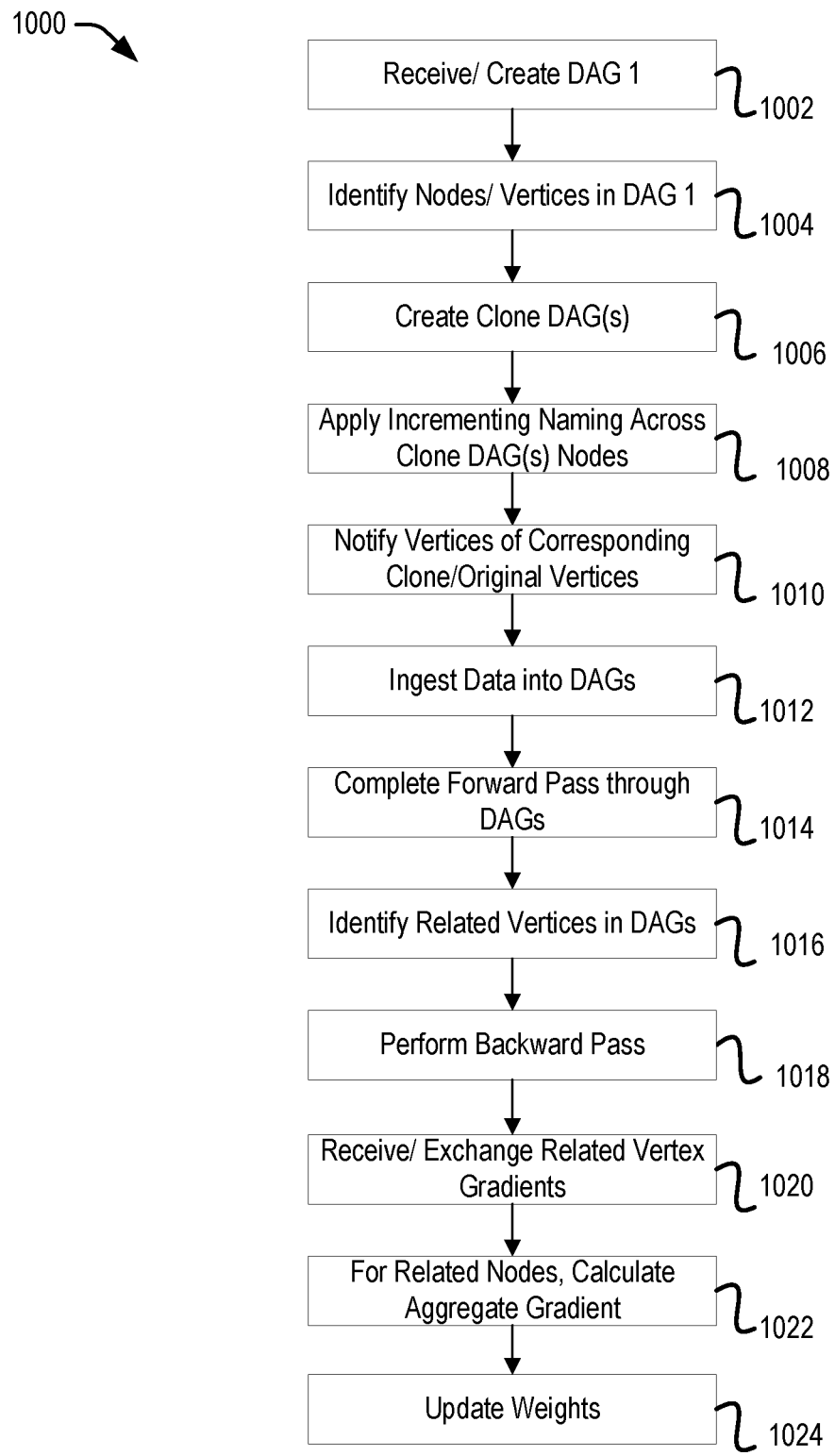
FIG. 10 is a flow chart of a process for updating weights across cloned directed acyclic graphs, according to some embodiments.

FIG. 10 is a flow chart of a process 1000 for updating weights across cloned DAGs, according to some embodiments. At block 1002, the process 1000 involves receiving, identifying, or creating a first DAG. A distributed computing system (e.g. the computing system 204 of FIG. 2) may receive or generate the first DAG that may represent various operations that are desired to be performed by the distributed computing system. The distributed computing system may receive the DAG from user input or any other suitable source, or the distributed computing system may generate the DAG based on a configuration file or any other suitable source for generating DAGs.

At block 1004, the process 1000 involves identifying nodes and vertices in the first DAG. The first DAG may include any suitable number of vertices across any suitable number of nodes for processing or otherwise performing operations included in an overall DAG. The first DAG may be a subset of the overall DAG. The distributed computing system may identify the nodes and the vertices of the first DAG for subsequent use.

At block 1006, the process 1000 involves creating at least one cloned DAG. In some examples, the first DAG may be similar or identical to the DAG 502 of FIG. 5 and the at least one cloned DAG may be similar or identical to the DAGs 504 or 506 of FIG. 5. The distributed computing system may, in response to identifying the nodes and the vertices of the first DAG, generate at least one cloned DAG. The at least one cloned DAG may be identical to the first DAG but may, in some examples, include nodes that are different than the nodes of the first DAG.

At block 1008, the process 1000 involves applying incrementing naming across the nodes of the at least one cloned DAG. Upon creation of the at least one cloned DAG, the distributed computing system may apply names to the nodes of the at least one cloned DAG. The at least one cloned DAG may include any suitable number of nodes for traversing the at least one cloned DAG. In some examples in which more than one cloned DAGs are generated, the distributed computing system may apply the names in incremental order to more easily or efficiently traverse and keep track of the more than one cloned DAGs.

At block 1010, the process 1000 involves notifying corresponding vertices of the first DAG and the at least one cloned DAG. The distributed computing system may make vertices of the first DAG and vertices of the at least one cloned DAG aware of the other's presence. For example, if vertex A of the first DAG corresponds to vertex B of the cloned DAG, the distributed computing system may notify vertex A that vertex B exists and may notify vertex B that vertex A exists. Additionally in this example, the notification transmitted by the distributed computing system may include information letting the vertex A and the vertex B know that the vertex A and the vertex B are desired to perform the same or similar operations pursuant to the distributed computing system traversing the first DAG and traversing the cloned DAG.

At block 1012, the process 1000 involves ingesting data into the first DAG and into the at least one cloned DAG. In response to notifying the corresponding vertices, the distributed computing system may ingest data into the first DAG and into the at least one cloned DAG. The data may include any suitable data for facilitating traversal of the first DAG and of the at least one cloned DAG. In some embodiments, the data ingested into the DAG and the at least one cloned DAG can be identical, and in some embodiments, the data ingested into the DAG and the at least one cloned DAG can be non-identical. In some embodiments, training with a set of data can be accelerated by splitting the data into multiple non-identical sub-sets, and training the DAG on one portions of these non-identical subsets and training each of the at least one cloned DAG on others At block 1014, the process 1000 involves completing a forward pass through the first DAG and through the at least one cloned DAG. Upon successful ingestion of data into the first DAG and into the at least one cloned DAG, the distributed computing system may traverse the first DAG and the at least one cloned DAG in a forward order.

At block 1016, the process 1000 involves progressing through the first DAG and the at least one cloned DAG and identifying related vertices. During the traversal of the first DAG and the at least one cloned DAG in forward order, the distributed computing system may identify corresponding or otherwise related vertices. The distributed computing system may request or receive information or otherwise enable data transfer to or from the related vertices.

At block 1018, the process 1000 includes performing a backwards pass through the at least one cloned DAG and the first DAG. The distributed computing system may traverse the first DAG and the at least one cloned DAG in reverse order compared to the traversal at block 1014. The reverse traversal may include similar or identical steps compared to the traversal at block 1014. In some embodiments, the backward pass can include the generation of a gradient for each of the vertices of the DAG and/or of the clone DAG(s). Thus, in some embodiments, each vertex of each of the DAG and the clone DAG(s) can have an associated gradient. In some embodiments in which a different set of data is used to train the DAG as compared to the at least one clone DAG, the gradients generated by vertices of DAG can be different than the gradients generated by corresponding clone vertices of the at least one clone DAG.

At block 1020, the process 1000 involves receiving or exchanging related vertex gradients. These vertex gradients can be generated as a part of block 1018 by the distributed computing system. The vertex gradients may be determined and grouped by node, and, in some examples, only one node is present in the first DAG and in the at least one cloned DAG for which the vertex gradients would be determined and grouped all together.

At block 1022, the process 1000 includes calculating aggregate gradients, also referred to herein as aggregate gradient data. In some embodiments, an aggregate gradient can be calculated through a summarization operation performed on gradients of corresponding vertices in the DAG and in the clone DAG(s). The aggregate gradient can, in some embodiments, be: a median gradient; a mean gradient such as an arithmetic mean, a geometric mean, or a harmonic mean; or the like. The aggregate gradients may be calculated during or after traversal or training of the first DAG, of the at least one cloned DAG, or a combination thereof. In some examples in which only one node is present in the first DAG and in the at least one cloned DAG, the distributed computing system may calculate one aggregate gradient for the related nodes. In other examples, the distributed computing system may calculate aggregate gradients for each related node in the first DAG and in the at least one cloned DAG. In some examples, the vertex or aggregate gradients may be calculated by the distributed computing system by calculating a loss that is a difference between an output of traversal and a target or expected output of traversal. The traversal may be a forward traversal, a backward traversal, or both.

In some embodiments, the calculating of aggregate gradients can result in uniformity between gradients of corresponding vertices of the DAG and the at least one clone DAG. Specifically, the gradient of each of a group of corresponding vertices of the DAG and the at least one clone DAG can be replaced by an aggregate gradient generated from the gradients of some or all of the corresponding vertices. Thus, differences in the gradients of the corresponding vertices, which differences can arise due to the use of different subsets of data in training the DAG and the at least one clone DAG can be minimized and/or eliminated.

At block 1024, the process 1000 involves updating weights associated with the DAG. These weights are updated based on the calculated aggregate gradients. In some embodiments, this can be performed according to synchronous gradient updates, or according to asynchronous gradient updates. In some embodiments, performing synchronous gradient updates can include determining that the aggregate gradient for each of the corresponding vertices is identical, and then updating the relevant weight(s) based on this aggregate gradient. In some embodiments, updating the weights can be performed according to any desired suitable algorithm, including for example: stochastic gradient descent with momentum; stochastic gradient descent without momentum; AdaGrad; RMSProp; or the like. Updating the weights may result in better subsequent traversals, which may mean that subsequent differences between the outputs of traversals and the expected or target outputs of traversals is closer to or equal to zero.

Figure 11:
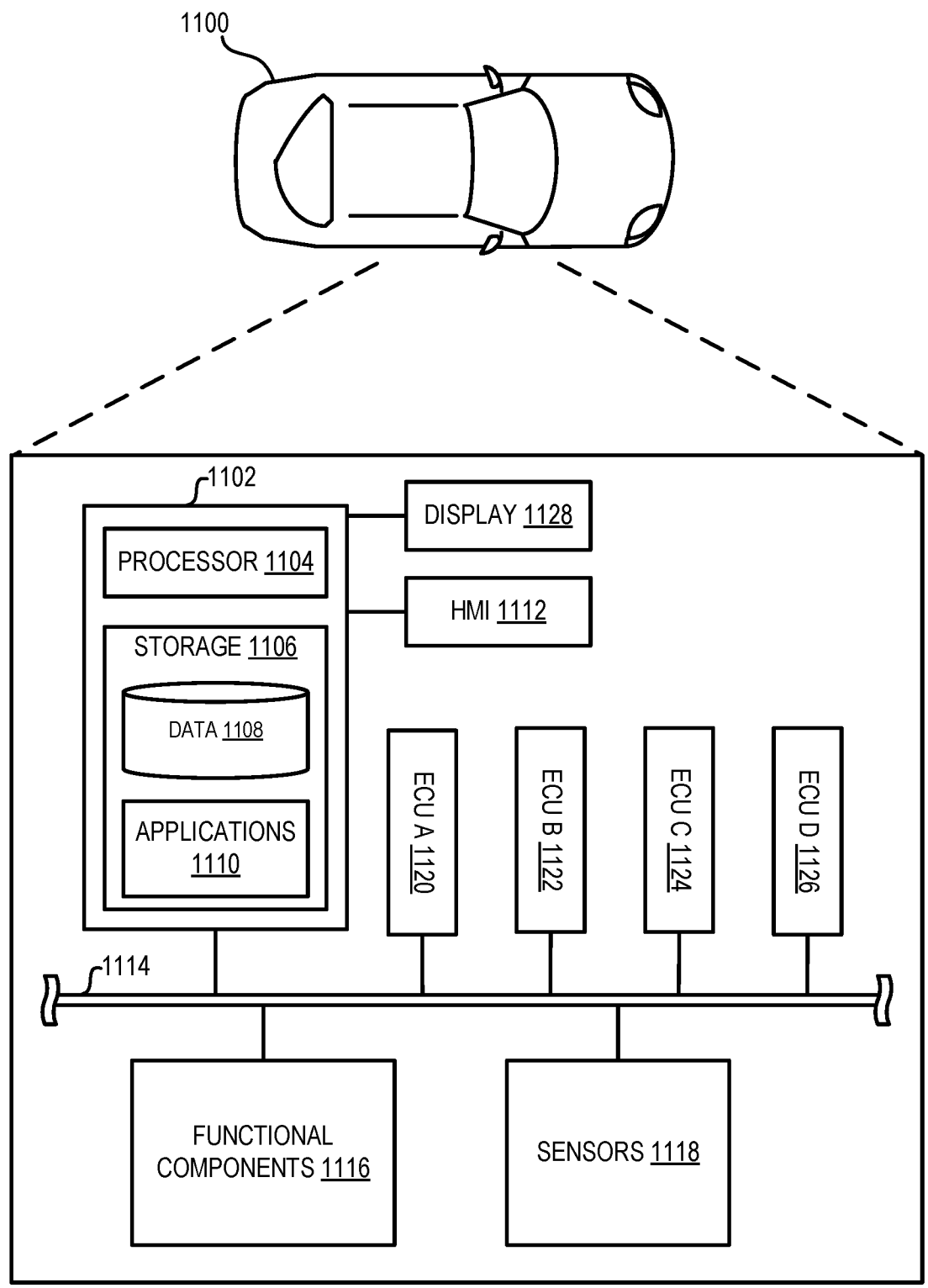
FIG. 11 is a block diagram of a vehicle system, according to some embodiments.
Figure 12:
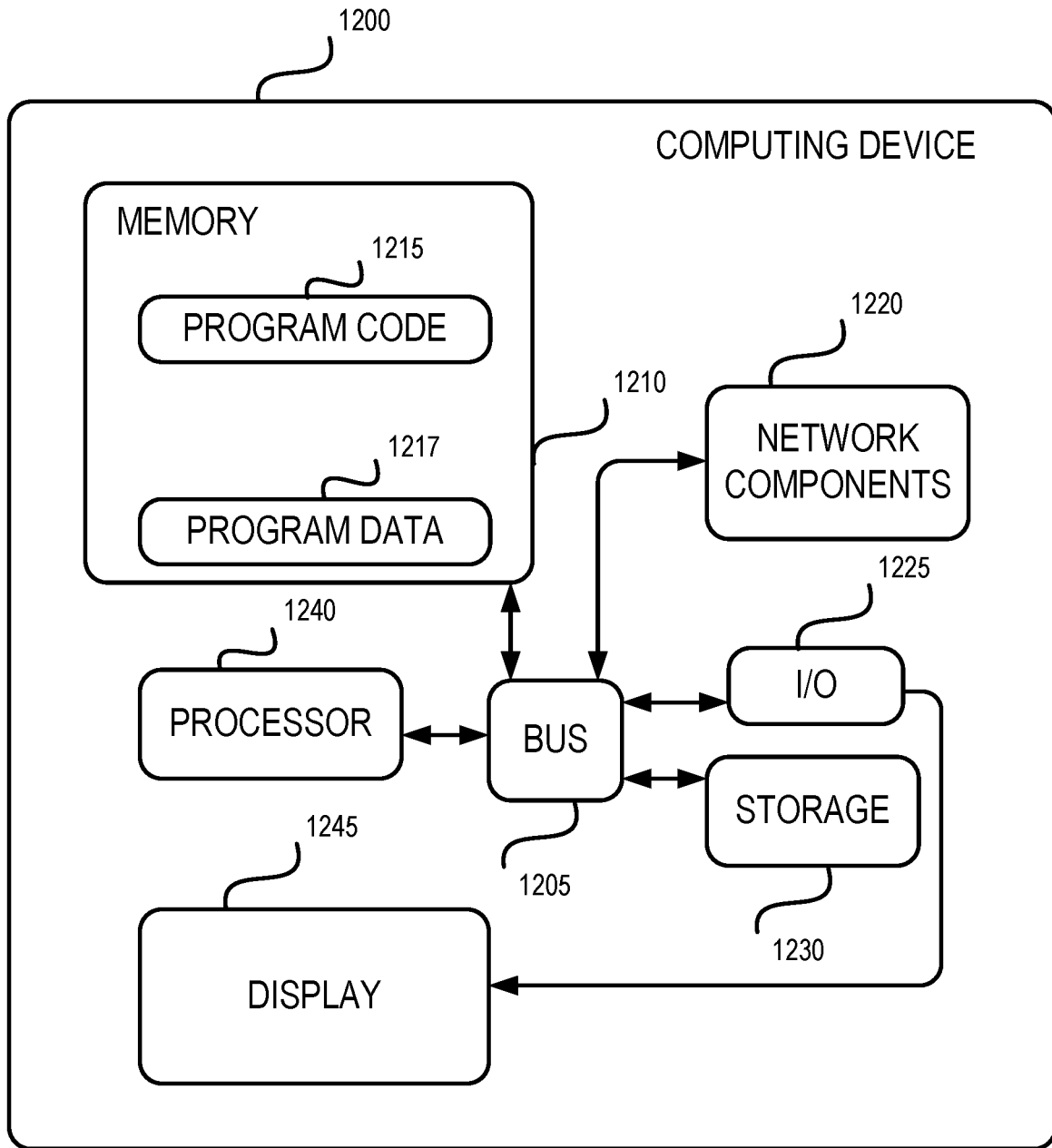
FIG. 12 is a block diagram of a computing system, according to some embodiments.

Any suitable computing system or group of computing systems can be used for performing the operations or methods described herein. For example, FIG. 11 illustrates a vehicle system including a computing system 1102 as well as multiple ECUs which may perform some or all of the functions described herein. FIG. 12 further depicts an example of a computing device 1200 that may be at least a portion of computing system 1102.

FIG. 11 illustrates a block diagram of a vehicle system 1100, according to some embodiments. The vehicle system 1100 may include a computing system 1102 configured to communicate over an in-vehicle network 1114. The computing system 1102 includes a processor 1104 and storage 1106. While a vehicle system 1100 is shown in FIG. 11, the example components as illustrated are not intended to be limiting. Indeed, the vehicle system 1100 may have more or fewer components, and additional or alternative components and/or implementations may be used. It should be noted that the use of a vehicle system 1100 environment is illustrative, as the components and/or functionality may be utilized in other types of systems such as flight control system in an airplane, or a medical device or industrial machine.

The vehicle system 1100 may include various types of automobile, crossover utility vehicle (CUV), sport utility vehicle (SUV), truck, recreational vehicle (RV), boat, plane or other mobile machine for transporting people or goods. In many cases, the vehicle system 1100 may be powered by an internal combustion engine. As another possibility, the vehicle system 1100 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 1100 may vary, the capabilities of the vehicle system may correspondingly vary. As some other possibilities, vehicle system 1100 may have different capabilities with respect to passenger capacity, towing ability and capacity, and storage volume.

The computing system 1102 may include a Human Machine Interface (HMI) 1112 and a display 1128 for user interaction with the computing system 1102. An example computing system 1102 may be the SYNC™ system provided by FORD MOTOR COMPANY™ of Dearborn, Michigan. In some examples the display 1128 may include a vehicle infotainment system including one or more displays. The HMI 1112 may be configured to support voice command and BLUETOOTH™ interfaces with the driver and driver carry-on devices, receive user input via various buttons or other controls, and provide vehicle status information to a driver or other vehicle system 1100 occupants. For instance, the computing system 1102 may interface with one or more buttons or other HMI 1112 configured to invoke functions on the computing system 1102 (e.g., steering wheel audio buttons, a push-to-talk button, instrument panel controls, etc.). The computing system 1102 may also drive or otherwise communicate with the display 1128 configured to provide visual output to vehicle occupants, e.g., by way of a video controller. In some cases, the display 1128 may be a touch screen further configured to receive user touch input via the video controller, while in other cases the display 1128 may be a display only, without touch input capabilities. In an example, the display 1128 may be a head unit display included in a center console area of the vehicle system 1100. In another example, the display 1128 may be a screen of a gauge cluster of the vehicle system 1100.

The computing system 1102 may further include various types of computing apparatus in support of performance of the functions of the computing system 1102 described herein. In an example, the computing system 1102 may include one or more processors 1104 configured to execute computer instructions, and a storage 1106 medium on which computer-executable instructions and/or data may be maintained. A computer-readable medium (also referred to as a processor-readable medium or storage 1106) includes any non-transitory (e.g., tangible) medium that participates in providing data (e.g., instructions) that may be read by a computer (e.g., by the one or more processors 1104). In general, the processor 1104 receives instructions and/or data, e.g., from the storage 1106, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 1106 may include divisions for data 1108 and applications 1110. The data 1108 may store information such as databases and other such information. The applications 1110 may store the computer-executable instructions or other such instructions executable by the processor 1104.

The computing system 1102 may be configured to communicate with mobile devices of the vehicle system 1100 occupants. The mobile devices may be any of various types of portable computing device, such as cellular phones, tablet computers, smart watches, laptop computers, portable music players, or other devices capable of communication with the computing system 1102. As with the computing system 1102, the mobile device may include one or more processors configured to execute computer instructions, and a storage medium on which the computer-executable instructions and/or data may be maintained. In some examples, the computing system 1102 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 1102 may communicate with the mobile device over a wired connection, such as via a USB connection between the mobile device and a Universal Serial Bus (USB) subsystem of the computing system 1102.

The computing system 1102 may be further configured to communicate with other components of the vehicle system 1100 via one or more in-vehicle networks 1114. The in-vehicle networks 1114 may include one or more of a vehicle controller area network (CAN), an Ethernet network, or a media oriented system transfer (MOST), as some examples. The in-vehicle networks 1114 may allow the computing system 1102 to communicate with other units of the vehicle system 1100, such as ECU A 1120, ECU B 1122, ECU C 1124, and ECU D 1126. The ECUs 1120, 1122, 1124, and 1126 may include various electrical or electromechanical systems of the vehicle system 1100 or control various subsystems of the vehicle system 1100. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 1100); a radio transceiver module configured to communicate with key fobs or other vehicle system 1100 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 1100 location and heading information, and various other vehicle ECUs configured to corporate with the computing system 1102. The subsystems controlled by the various ECUs may include functional components 1116 of the vehicle system 1100 including elements such as the powertrain, engine, brakes, lights, steering components, and the like. Additionally, some or all of the functional components 1116 may include sensors 1118 as well as additional sensors equipped to the vehicle system 1100 for detecting various states, positions, proximity, temperature, and the like of the vehicle system 1100 and subsystems thereof. The ECUs 1120, 1122, 1124, 1126 may communicate with the computing system 1102 as well as the functional components 1116 and the sensors 1118 over the in-vehicle network 1114. While only four ECUs are depicted in FIG. 11, any number (more or fewer) of ECUs may be included in vehicle system 1100.

FIG. 12 illustrates a block diagram of an example of a computing device 1200. Computing device 1200 can be any of the described computers herein including, for example, computing system 1102 within the vehicle system 1100 of FIG. 11 as well as ECUs 1120, 1122, 1124, 1126. The computing device 1200 can be or include, for example, an integrated computer, a laptop computer, desktop computer, tablet, server, or other electronic device.

The computing device 1200 can include a processor 1240 interfaced with other hardware via a bus 1205. A memory 1210, which can include any suitable tangible (and non-transitory) computer readable medium, such as RAM, ROM, EEPROM, or the like, can embody program components (e.g., program code 1215) that configure operation of the computing device 1200. Memory 1210 can store the program code 1215, program data 1217, or both. In some examples, the computing device 1200 can include input/output ("I/O") interface components 1225 (e.g., for interfacing with a display 1245, keyboard, mouse, and the like) and additional storage 1230.

The computing device 1200 executes program code 1215 that configures the processor 1240 to perform one or more of the operations described herein. Examples of the program code 1215 include, in various embodiments logic flowchart described with respect to FIG. 11 above. The program code 1215 may be resident in the memory 1210 or any suitable computer-readable medium and may be executed by the processor 1240 or any other suitable processor.

The computing device 1200 may generate or receive program data 1217 by virtue of executing the program code 1215. For example, sensor data, trip counter, authenticated messages, trip flags, and other data described herein are all examples of program data 1217 that may be used by the computing device 1200 during execution of the program code 1215.

The computing device 1200 can include network components 1220. Network components 1220 can represent one or more of any components that facilitate a network connection. In some examples, the network components 1220 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 1220 can be wired and can include interfaces such as Ethernet, USB, or IEEE 1394.

Although FIG. 12 depicts a computing device 1200 with a processor 1240, the system can include any number of computing devices 1200 and any number of processors 1240. For example, multiple computing devices 1200 or multiple processor 1240 can be distributed over a wired or wireless network (e.g., a Wide Area Network, Local Area Network, or the Internet). The multiple computing devices 1200 or multiple processor 1240 can perform any of the steps of the present disclosure individually or in coordination with one another.

Figure 13:
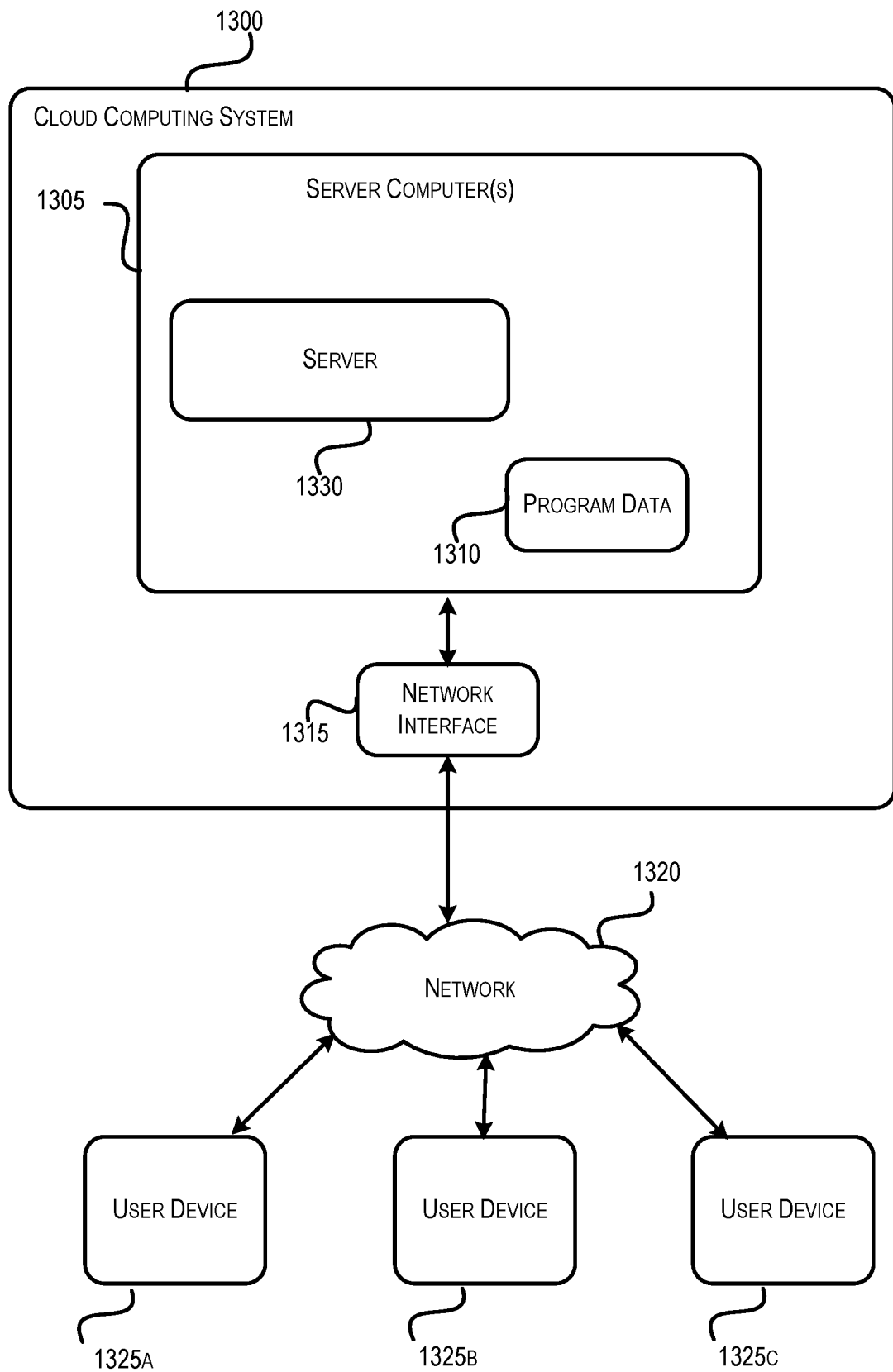
FIG. 13 is a cloud computing system, according to some embodiments.

In some embodiments, the functionality provided by the computing system 1300 may be offered as cloud services by a cloud service provider. For example, FIG. 13 depicts an example of a cloud computing system 1300 offering an intelligence service that can be used by a number of user subscribers using user devices 1325a, 1325b, and 1325c across a data network 1320. User devices 1325a, 1325b, and 1325c could be examples of a vehicle system 1100 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 1305.

The remote server computers 1305 include any suitable non-transitory computer-readable medium for storing program code (e.g., server 1330) and program data 1310, or both, which is used by the cloud computing system 1300 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 305 can include volatile memory, non-volatile memory, or a combination thereof.

One or more of the server computers 1305 execute the program data 1310 that configures one or more processors of the server computers 1305 to perform one or more of the operations that determine locations for interactive elements and operate the adaptive rule-based system. As depicted in the embodiment in FIG. 13, the one or more server computers 1305 provide the services to perform the adaptive rule-based system via the server 1330. Any other suitable systems or subsystems that perform one or more operations described herein (e.g., one or more development systems for configuring an interactive user interface) can also be implemented by the cloud computing system 1300.

In certain embodiments, the cloud computing system 1300 may implement the services by executing program code and/or using program data 1310, which may be resident in a memory device of the server computers 1305 or any suitable computer-readable medium and may be executed by the processors of the server computers 1305 or any other suitable processor.

In some embodiments, the program data 1310 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 1320.

The cloud computing system 1300 also includes a network interface device 1315 that enable communications to and from cloud computing system 1300. In certain embodiments, the network interface device 1315 includes any device or group of devices suitable for establishing a wired or wireless data connection to the data networks 1320. Non-limiting examples of the network interface device 1315 include an Ethernet network adapter, a modem, and/or the like. The server 1330 is able to communicate with the user devices 1325a, 1325b, and 1325c via the data network 1320 using the network interface device 1315.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method of distributed computing, the method comprising:
   identifying a directed acyclic graph ("DAG"), the DAG comprising a plurality of vertices linked in pairwise relationships via a plurality of edges;
   creating at least one clone DAG identical to at least a portion of the DAG, the at least one clone DAG comprising a plurality of clone vertices;
   for each of the vertices of the DAG, identifying a corresponding clone vertex from the clone vertices of the at least one clone DAG;
   training the DAG and the least one clone DAG, each of the vertices of the DAG and each of the corresponding clone vertices of the at least one clone DAG have a gradient as a result of the training;
   traversing the DAG and the at least one clone DAG in a first direction, wherein the clone vertices of the at least one clone DAG and its corresponding vertices of the DAG exchange first gradient data during traversal of the DAG and the at least one clone DAG;
   calculating first gradient data for related nodes of the DAG and the at least one clone DAG based on the first gradient data exchanged between each of the clone vertices and its corresponding vertex in the DAG during traversal of the DAG and the at least one clone DAG in the first direction;
   traversing the DAG and the at least one clone DAG in a second direction that is a reverse direction with respect to the first direction;
   calculating second gradient data for related nodes of the DAG and the at least one clone DAG based on second gradient data exchanged between each of the clone vertices and its corresponding vertex in the DAG during traversal of the DAG and the at least one clone DAG in the second direction;
   calculating aggregate gradient data based on the first gradient data and the second gradient data; and
   updating at least one weight of the DAG and of the at least one clone DAG based on the aggregate gradient data.

2. The method of claim 1, further comprising identifying the vertices of the DAG, and wherein aggregate gradient data based on gradient data from each of the clone vertices and its corresponding vertex in the DAG are calculated during training.

3. The method of claim 2, wherein identifying the corresponding clone vertex from the clone vertices of the at least one clone DAG comprises: applying incrementing naming across the clone vertices of the at least one clone DAG; notifying vertices of the DAG of their corresponding clone vertices of the at least one clone DAG; and notifying clone vertices of the at least one clone DAG of their corresponding vertices of the DAG.

4. The method of claim 1, wherein training each of the DAG and the at least one clone DAG comprises: ingesting first data into the DAG and ingesting second data into the at least one clone DAG.

5. The method of claim 4, wherein the first data and the second data are non-identical.

6. The method of claim 1, wherein calculating aggregate gradient data based on the first gradient data and the second gradient data comprises calculating mean gradient data.

7. The method of claim 1, wherein the updating at least one weight of the DAG and of the at least one clone DAG based on the aggregate gradient data is performed according to synchronous gradient updates.

8. The method of claim 1, wherein the updating at least one weight of the DAG and of the at least one clone DAG based on the aggregate gradient data is performed according to asynchronous gradient updates.

9. A system comprising:
   one or more processors; and
   one or more memories storing computer-executable instructions that, when executed by the one or more processors, configure the one or more processors to:
      identify a directed acyclic graph ("DAG"), the DAG comprising a plurality of vertices linked in pairwise relationships via a plurality of edges;
      create at least one clone DAG identical to at least a portion of the DAG, the at least one clone DAG comprising a plurality of clone vertices;
      for each of the vertices of the DAG, identify a corresponding clone vertex from the clone vertices of the at least one clone DAG;
      train the DAG and the least one clone DAG, each of the vertices of the DAG and each of the corresponding clone vertices of the at least one clone DAG have a gradient as a result of the training;
      traverse the DAG and the at least one clone DAG in a first direction, wherein the clone vertices of the at least one clone DAG and its corresponding vertices of the DAG exchange first gradient data during traversal of the DAG and the at least one clone DAG;
      calculate first gradient data for related nodes of the DAG and the at least one clone DAG based on the first gradient data exchanged between each of the clone vertices and its corresponding vertex in the DAG during traversal of the DAG and the at least one clone DAG in the first direction;

traverse the DAG and the at least one clone DAG in a second direction that is a reverse direction with respect to the first direction;

calculate second gradient data for related nodes of the DAG and the at least one clone DAG based on second gradient data exchanged between each of the clone vertices and its corresponding vertex in the DAG during traversal of the DAG and the at least one clone DAG in the second direction;

calculate aggregate gradient data based on the first gradient data and the second gradient data; and update at least one weight of the DAG and of the at least one clone DAG based on the aggregate gradient data.

10. The system of claim 9, wherein the computer-executable instructions that, when executed by the one or more processors, further configure the one or more processors to identify the vertices of the DAG, and wherein aggregate gradient data based on gradient data from each of the clone vertices and its corresponding vertex in the DAG are calculated during training.

11. The system of claim 10, wherein identifying the corresponding clone vertex from the clone vertices of the at least one clone DAG comprises: applying incrementing naming across the clone vertices of the at least one clone DAG; notifying vertices of the DAG of their corresponding clone vertices of the at least one clone DAG; and notifying clone vertices of the at least one clone DAG of their corresponding vertices of the DAG.

12. The system of claim 9, wherein training each of the DAG and the at least one clone DAG comprises: ingesting first data into the DAG and ingesting second data into the at least one clone DAG.

13. The system of claim 12, wherein the first data and the second data are non-identical.

14. The system of claim 9, wherein calculating aggregate gradient data based on the first gradient data and the second gradient data comprises calculating mean gradient data.

15. The system of claim 9, wherein the updating at least one weight of the DAG and of the at least one clone DAG based on the aggregate gradient data is configured to be performed according to synchronous gradient updates.

16. The system of claim 9, wherein the updating at least one weight of the DAG and of the at least one clone DAG based on the aggregate gradient data is configured to be performed according to asynchronous gradient updates.

* * * * *